United States Patent
Lal et al.

(10) Patent No.: US 12,003,489 B2
(45) Date of Patent: Jun. 4, 2024

(54) MECHANISMS TO REDUCE EXPOSURE OF SENSITIVE TELEMETRY DATA IN COMPUTING NETWORKS

(71) Applicant: Intel Corporation, Santa Clara, CA (US)

(72) Inventors: Reshma Lal, Portland, OR (US); Anahit Tarkhanyan, Cupertino, CA (US); Jianping Xu, Portland, OR (US); Christine E. Severns-Williams, Deephaven, MN (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 17/544,355

(22) Filed: Dec. 7, 2021

(65) Prior Publication Data

US 2022/0141201 A1     May 5, 2022

(51) Int. Cl.
*H04L 9/40* (2022.01)
*H04L 9/08* (2006.01)
*H04L 9/32* (2006.01)
*H04L 43/04* (2022.01)
*H04L 43/06* (2022.01)
H04L 43/0817 (2022.01)

(52) U.S. Cl.
CPC ........ *H04L 63/0428* (2013.01); *H04L 9/0819* (2013.01); *H04L 9/321* (2013.01); *H04L 9/3263* (2013.01); *H04L 43/04* (2013.01); *H04L 43/06* (2013.01); *H04L 63/0823* (2013.01); *H04L 63/10* (2013.01); *H04L 63/1433* (2013.01); *H04L 63/1475* (2013.01); *H04L 43/0817* (2013.01); *H04L 63/20* (2013.01)

(58) Field of Classification Search
None
See application file for complete search history.

(56) References Cited

U.S. PATENT DOCUMENTS

| 10,586,164 B1 | 3/2020 | Sengupta et al. |
| 2018/0024868 A1 | 1/2018 | Mehta et al. |

(Continued)

OTHER PUBLICATIONS

EPO European Extended Search Report in EP Application Serial No. 22202466.3 dated Apr. 12, 2023, 6 pages.
Brownlee, Jason; "Comparing Classical and Machine Learning Algorithms for Time Series Forecasting," retrieved from https://machinelearningmastery.com/findings-comparing-classical-and-machine-learning-methods-for-time-series-forecasting/; Oct. 31, 2018 (and updated Aug. 5, 2019); 30 pages.

(Continued)

*Primary Examiner* — Brandon Hoffman
(74) *Attorney, Agent, or Firm* — Alliance IP, LLC

(57) ABSTRACT

One or more machine readable storage media, an apparatus, and a method. The apparatus provides a mechanism to implement a trusted telemetry governor (TTG) inside a trusted execution environment. The TTG is to determine a security policy to be applied to telemetry data corresponding to component of a computing infrastructure, receive the telemetry data in encrypted format and, based on the security policy: process the telemetry data including at least one of generating transformed telemetry data or analyzing the telemetry data to generate a report therefrom, and generating telemetry information from the telemetry data. The telemetry information includes at least one of processed telemetry data, a report, or a recommendation based on an analysis of the telemetry data. The TTG is to send the telemetry information outside of the trusted execution environment to a consumer of the telemetry data.

22 Claims, 6 Drawing Sheets

(56) References Cited

U.S. PATENT DOCUMENTS

| | | | |
|---|---|---|---|
| 2019/0146862 A1 | 5/2019 | Kephart et al. | |
| 2019/0281132 A1* | 9/2019 | Sethuraman | H04L 67/303 |
| 2019/0362222 A1 | 11/2019 | Chen | |
| 2020/0160207 A1 | 5/2020 | Song et al. | |
| 2021/0117242 A1* | 4/2021 | Van De Groenendaal | H04L 67/1001 |
| 2021/0144517 A1* | 5/2021 | Guim Bernat | H04W 12/04 |
| 2021/0192390 A1 | 6/2021 | Iyengar et al. | |
| 2021/0264294 A1 | 8/2021 | Zheng et al. | |
| 2021/0374027 A1 | 12/2021 | Joglekar et al. | |
| 2021/0383271 A1 | 12/2021 | Slinger et al. | |
| 2022/0012112 A1 | 1/2022 | Wouhaybi et al. | |
| 2022/0083389 A1 | 3/2022 | Poothia et al. | |

OTHER PUBLICATIONS

Deierling, Kevin; "What is a DPU?" NVIDIA blog, retrieved from the Internet at https://blogs.nvidia.com/log/2020/05/20/whats-a-dpu-data-processing-unit/; May 20, 2020; 7 pages.

Intel Newsroom; "Intel Unveils Infrastructure Processing Unit," retrieved from https://www.intel.com/content/www/us/en/newsroom/news/infrastructure-processing-unit-data-center.html#gs.em0wsx; Jun. 14, 2021; 7 pages.

Wikipedia; "Data Processing Unit," retrieved from the Internet at https://en.wikipedia.org/w/index.php?title=Data_processing_unit&oldid=1032047248; page version dated Jul. 5, 2021; 2 pages.

USPTO Non-Final Office Action for U.S. Appl. No. 17/485,335 dated Sep. 2, 2022 entitled, Creating Robustness Scores for Selected Portions of a Computing Infrastructure (16 pages).

* cited by examiner

MECHANISMS TO REDUCE EXPOSURE OF SENSITIVE TELEMETRY DATA IN COMPUTING NETWORKS

TECHNICAL FIELD

The present disclosure relates in general to the field of computers, and more specifically, to the processing of telemetry data within a computing infrastructure.

BACKGROUND

Telemetry is used in computing infrastructures to provide metrics regarding computation and compute resources, such as metrics on central processing unit (CPU), memory, storage, devices etc. Telemetry is used to monitor systems, perform usage analytics, find performance bottlenecks, identify issues, predict future system load, to name a few examples. Collecting, analyzing, and acting on telemetry data in the compute environment is hugely beneficial to both the platform/infrastructure owner such as cloud service provider (CSP), to enterprise and to tenants, e.g. CSP customers such as computing nodes of the infrastructure which develop and deploy applications. For tenants, telemetry enables the identification of potential issues, the detection of hidden patterns in the design or deployment of their workload that could be problematic or create bottlenecks, and provides insights regarding their workload. Additionally, tenants can benefit from measuring and reporting the security and privacy regulatory compliance aspects of the compute environment, which can be delivered via telemetry. A telemetry data consumer, which could be the CSP, enterprise/orchestrator or tenant, collect telemetry to monitor performance, trace hardware utilization, detect issues, identify load balancing needs, and make adjustments or fix issues as needed to ensure better performance, higher availability and maximum utilization of their resources in datacenter and/or in an edge environment.

Consistent with the examples provided herein, a "computing node" or "node" may be embodied as any type of element, component, device, appliance, or other thing capable of communicating as a producer or consumer of data within a computing system, such as system 200 of FIG. 2 described in further detail below. A "computing system" as referred to herein may refer to a data center or other type of cloud or edge computing environment where computing nodes are networked with one another. Further, the label "node" or "device" as used in the computing system does not necessarily mean that such node or device operates in a client/tenant/agent/minion/follower role; rather, any of the nodes or devices in the computing system refer to individual entities, nodes, or subsystems which include discrete or connected hardware or software configurations to facilitate or use resources within the computing system.

Telemetry data can include high level system metrics such as CPU utilization, memory utilization, IO overhead etc. or more fine grained metrics such as voltage or power analysis of hardware blocks inside an SoC. While more fine grained metrics may provide important insights related to workload behavior and make it possible to diagnose anomalies, optimize resource allocation, and increase overall efficiency of the computing system/compute environment (e.g. data center or edge server), they could expose sensitive data directly or indirectly as through side channels, creating potential for security or privacy violations.

DETAILED DESCRIPTION

Figure 1:
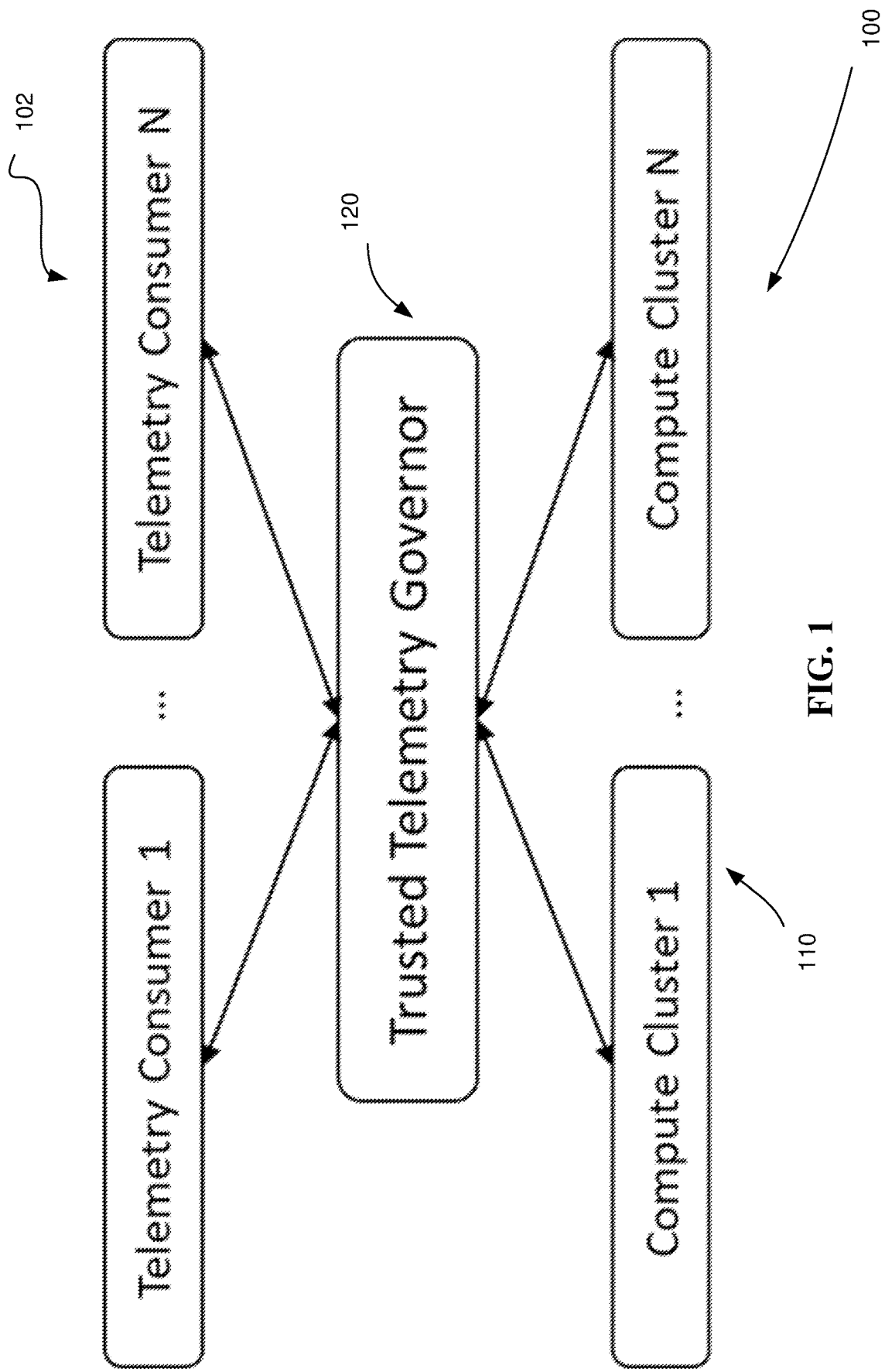
FIG. 1 is a block diagram illustrating a computing system including a computing infrastructure, a trusted telemetry governor (TTG) in a trusted execution environment, along with telemetry data consumers, such as tenants or cloud service providers (CSPs), according to some embodiments.

The following disclosure provides various possible embodiments, or examples, for implementing features disclosed in this specification. These features are related to the protection from malicious attack of telemetry data in a distributed computing system, where the telemetry data is to be used to measure of the health state of a selected portion in a computing infrastructure. Telemetry data may be used to assess the health of selected portions of the computing infrastructure such as a hardware component contained in a node in the computing infrastructure, a node in the computing infrastructure, or a cluster of nodes in the computing infrastructure. The health state is indicative of the reliability, resilience, performance capability with respect to a given workload, and remaining lifetime of the selected portion. Generally, analysis of telemetry data by a telemetry data consumer, such as a node in the computing infrastructure, or such as a cloud service provider (CSP) allows the consumer to determine confidence in the robustness of each node or hardware component that can be clustered to create confidence in the up-time and resilience of different parts of the computing infrastructure. As a result, the telemetry consumer could potentially zoom in for micro assessment of one hardware component, zoom out to assess an individual node, or zoom out in various degrees to assess a rack, a zone, a floor, an entire bank of compute in a building, an entire computing infrastructure, or more.

Some tenants in a network or system may wish to observe telemetry data or statistics for the execution of their workloads in a public cloud, where they use the public cloud for its computing resources in order to have those workloads executed.

A "network" as used herein is to refer to a set of computing devices sharing resources located on or provided by network nodes. The computing devices use common communication protocols over digital interconnections to communicate with each other. These interconnections are made up of telecommunication network technologies, based on physically wired, optical, and wireless radio-frequency methods that may be arranged in a variety of network topologies.

Based on observation of telemetry data, tenants may make adjustments to the manner in which their workloads are executed, for example to achieve a better health state, including efficiency, performance and hardware life expectancy. Tenants may wish to assess, for example, how much memory the workload is using, how much power it is consuming, or any bottlenecks concerning execution of their workloads. The tenants may need to, based on telemetry data, redesign their algorithms based on their performance goals.

A cloud service provider (CSP), which corresponds to an entity providing its cloud resources to a tenant for execution of tenant workloads, may want to observe telemetry data as well related to use of its resources, so that it can ensure a more efficient use of such resources, for example in a way that optimizes power and performance characteristics. For example, a health state of CSP resources as determined from telemetry data may show that some cloud resources might be getting overloaded and pushing the power envelope. The cloud service provider, based on telemetry data, may migrate some of the workload based on their performance goals.

The above mechanism provides some disadvantages, in part because the CSP, by collecting telemetry data corresponding to tenant workload execution, may gain access to operations of a tenant that should be kept secret.

Some embodiments aim at ensuring that the CSP can gather telemetry data without any leakage of a tenant's sensitive content as could be gathered from the tenant's telemetry data. The tenant may be running workload that has very high confidentiality associated with some of the associated data.

Given the mutual distrust between tenant and CSP, some embodiments aim to allow the CSP be able to gather telemetry information for tenant in a manner that does not lead to leakage of the tenant's confidential data. The tenant may, according to some embodiments, assume that the CSP code is malicious and could therefore be used to steal sensitive data. The tenant may, according to some embodiments, assume that the CSP may have administrators who are themselves corrupt and who have the intent to steal confidential tenant data. Some embodiments therefore aim toward enabling an architecture that provides a multi-tiered access control for collection and distribution of telemetry data sets in a manner that takes into account a tenant security goals and the CSP's goals in terms of using telemetry information, for example for resource allocation based on the health state of resources executing a workload for the tenant.

By way of example telemetry data on a platform may be used to reconstruct artificial intelligence (AI) models used on that platform. Given the prevalence of AI and the cost associated with developing it, having a secure manner of conveying telemetry data or telemetry information while protecting secret tenant information becomes even more important. For example collecting telemetry data from a central processing unit (CPU), memory, or other components of a platform can help an attacker recreate the AI model.

By way of another example, data sent from a CPU to graphics processing unit (GPU) may be encrypted. However the GPU will first decrypt the data before executing a workload on it. For any decrypted CPU data within the GPU, there could be telemetry data being collected on a number of parameters, for example which hardware blocks within the GPU are being used to execute a given workload, the type and amount of data passed from the CPU to the GPU, etc. In such a case, according to the state of the art, although the data going between various components of a platform may be cryptographically protected, the telemetry data collected from each of those components would not be. Such telemetry data may be used for example to determine a health state of the GPU for execution of a workload, such as whether the GPU is overloaded, whether some of the workload being executed by the GPU would need to be shifted to another GPU, etc. Such telemetry data may for example be used to inform the CSP of the health state of a given GPU in the context of execution of a workload in order to allow the CSP to make determinations regarding resource allocation for execution of the workload.

According to another example, where encrypted data is being transferred between platform components and a CSP is collecting telemetry data on such data transfer, parameters such as the amount of data being transferred, the frequency at which the data is transferred, the source and the destination of such data transfer, may allow an attacker to reverse engineer the encryption key being used on the data while it is being transferred, for example by looking at power characteristics associated with the transfer. The latter may correspond to a side channel attack or a differential power attack, which may jeopardize sensitive tenant content. Therefore encryption may not always address the question of trust where telemetry data is being collected in a distributed environment.

The current state of the art does not provide any mechanism to protect telemetry data from malicious access by a CSP in a distributed environment.

As noted previously, telemetry data could expose sensitive data directly or indirectly as through side channels, creating potential for security or privacy violations. As an example, there are well documented research results showing that through power analysis of a hardware crypto block, it is possible to reverse engineer cryptographic keys even though the data is encrypted.

Some embodiments propose a security architecture to collect and disseminate telemetry-based information in a secure manner and with proper access control such that exposure of security sensitive telemetry to cyber security attacks can be reduced.

There are existing open source and commercial solutions that provide system level metrics, such CPU and memory utilization, and IO performance metrics, and deliver them over a network to a computing infrastructure telemetry consumer. There are also proprietary solutions such as ones deployed by operating system vendors that collect different levels of telemetry and use them to diagnose failures, understand system usage etc.

These solutions may offer some options for the users to opt in or opt out, thereby allowing control over what telemetry could be gathered by system software and over how the telemetry would be used. However, they do not have any protection against cyber security threats where an attacker can exploit the system software to gain access to telemetry data and use the same to steal secrets or violate data integrity. Further, there is no solution today to isolate a tenant's sensitive telemetry information and limit its exposure to the platform owner such as a CSP, who is outside tenant's trust boundary.

For purposes of illustrating the several embodiments of a computing infrastructure implemented with security features to prevent exposure of sensitive telemetry data, it is important to first understand the operations and activities associated with computing infrastructures and disaggregated components. Accordingly, the following foundational information may be viewed as a basis from which the present disclosure may be properly explained.

Today's computing infrastructures may be implemented on-site for an entity (e.g., business, government, school, or other organization, etc.) or remotely (e.g., in a cloud). Cloud computing infrastructures may be accessible privately or publicly and may host and/or provide services to multiple entities and/or individuals. Hardware platforms of computing infrastructures can include disaggregated elements (which may be embodied as nodes or within nodes) such as general-purpose processors (CPUs), heterogeneous accelerators (xPUs), storage devices, memory, network devices, and infrastructure processing units (IPUs), for example. The hardware platform of a node can include multiple hardware components, which, in at least some cases, can be the same or similar. For example, a compute node may include one or more central processing units (CPUs), a storage node may include one or more storage devices (e.g., solid-state storage device, etc.), an accelerator node may include one or more accelerators (e.g., GPUs, xPUs, etc.), and a network node may include one or more network devices (e.g., routers, switches, hubs, gateways, etc.). In more traditional, non-disaggregated computing infrastructures, a node can include, e.g., compute, storage, and network hardware components provisioned in the same server. Moreover, accelerators are often implemented in the same node to run in parallel with a more general-purpose CPU.

The health state of nodes and clusters of nodes within a computing infrastructure of a computing system can be critically important for example, when workloads are time-sensitive or when workloads are essential to the survival of a business or organization. Mission critical workloads typically need to run on systems that have persistent up-time. At the data center level, an administrator may rely on the nodes to self-report errors and other problems that indicate the health state of the node or that can impact the up-time of the node or a cluster containing the node. However, sending telemetry data regarding a node of a computing infrastructure to another node in a distributed environment, such as a data center and/or cloud or edge environment, can expose sensitive information regarding the functioning of the node, such as cryptographic keys, artificial intelligence algorithms, and the like. Current systems do not provide mechanisms to protect raw telemetry data from malicious attacks.

The problem of malicious attacks based on telemetry data can become particularly troublesome for disaggregated computing infrastructure environments. While disaggregated environments offer enormous benefits in terms of computing cost reductions (e.g., as processing data is moved from CPUs to optimized hardware), improved latency (e.g., as xPUs are extricated from CPUs), reduced data movement costs (e.g., as data becomes directly accessible), and improved scalability, the communications between the different infrastructure nodes, and the larger volume and types of telemetry data, may expose computing components and their interfaces even further to the type of malicious attack that can use telemetry data to decipher secret information the malicious use of which can adversely affect a large system of interconnected computing platforms.

Some embodiments provide a mechanism to implement a trusted telemetry governor (TTG) inside a trusted execution environment. The TTG is to determine a security policy to be applied to telemetry data corresponding to component of a computing infrastructure, receive the telemetry data in encrypted format and, based on the security policy: process the telemetry data including at least one of generating transformed telemetry data or analyzing the telemetry data to generate a report therefrom, and generating telemetry information from the telemetry data. The telemetry information includes at least one of processed telemetry data, a report, or a recommendation based on an analysis of the telemetry data. The TTG is to send the telemetry information outside of the trusted execution environment.

Some embodiments increase trust in a multiparty network, such as a data center, including a cloud data center or an edge network, where telemetry data is to be sent across network nodes. Some embodiments achieve the increase in trust by providing an access control mechanism that is to authenticate a requester of the telemetry data as an entity authorized to ask for such data, and that may access the telemetry data in either raw form and or in processed form.

Referring first to FIG. 1, the figure is a block diagram illustrating a computing system 100 including a computing infrastructure 110, a TTG 120 in a trusted execution environment, along with telemetry data consumers, such as tenants or cloud service providers (CSPs). The TTG may be embodied as an intelligent and trusted software or firmware module to operate in a trusted execution environment, and primarily responsible for releasing telemetry information to consumers that are authorized, based on security policies configured to the TTG, to access such telemetry information. By "telemetry information," what is meant herein is either telemetry data (whether encrypted or unencrypted, raw or processed) or a report based on telemetry data, such as a report based on an analysis of telemetry data by a TTG. According to some embodiments, the TTG, by processing telemetry data only in a secure environment that guards against exposing the raw telemetry data outside of the computing infrastructure component from which the telemetry data was collected (unless security policies allow such exposure) advantageously establishes a trusted relationship with telemetry consumers such as tenants, infrastructure owners such as CSPs or enterprise IT, after they present authorization information, such as a signed certificate, for accessing certain telemetry information. The TTG may process raw telemetry data by altering it in some form, for example by analyzing the telemetry data to generate telemetry data that is encrypted (if the raw telemetry data was unencrypted) or that is differently encrypted (if the raw telemetry data was encrypted before arriving at the TTG), by analyzing the telemetry data to generate a report or recommendation based on the same, by filtering the telemetry data to isolate the telemetry data by level of sensitivity based on security policies, to name a few examples.

The TTG provides an intelligent telemetry broker authorized to collect low level telemetry data from computing infrastructure components (or "computing resources"). The TTG may be programmed or configured with a security policy that details which consumer is authorized to access which telemetry data, and the form of the telemetry data that may be made to be accessible by the consumer. For example, a security policy may state that select telemetry data directly associated with a workload may be provided only to the application owner, or that select telemetry data may be meant just for the CSP and should not be accessible to the tenants, etc. Another security policy may state that certain telemetry data, such as power analytics of a hardware cryptographic engine, must be filtered or transformed and not provided in raw form to certain consumers to remove direct exposure to sensitive content. Based on the security policies, it performs the necessary processing on the telemetry data and applies access control as it makes it available to the telemetry data consumers.

Some embodiments provide a mechanism to implement access control of telemetry data by providing a trusted telemetry governor (TTG), telemetry data collectors (TTCs) and one or more telemetry data ports (TDPs) for the transfer of telemetry data outside of a given computing infrastructure component, such as outside of a CPU, FPGA, GPU, storage, or NIC, and for provision of telemetry information to a consumer of telemetry data. Some embodiments provide software modules to implement algorithms to manage telemetry data, for example by processing, such as by analyzing, filtering and/or transforming such data before transferring information based on such data to a consumer of the same, in this manner ensuring not to send raw telemetry data outside of such computing infrastructure components based on security policies associated with access to the raw telemetry data. According to some embodiments, artificial intelligence entities may also be part of mechanism to implement analytics to determine what telemetry data is shared with which tenant and in what form.

Figure 2:
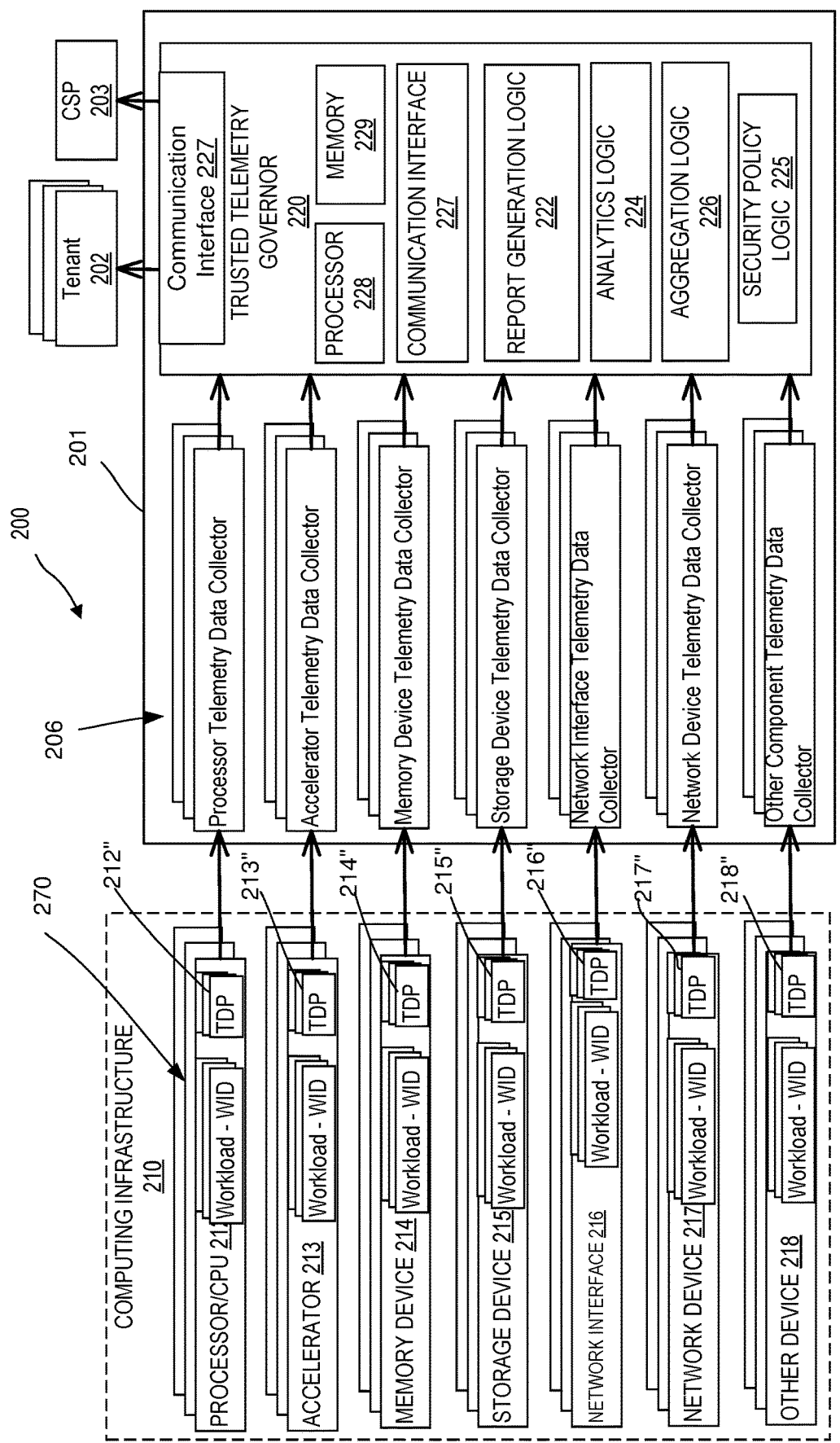
FIG. 2 is a block diagram showing a computing system including a computing infrastructure, a TTG in a trusted execution environment, and associated systems according to some embodiments.

Referring now to the figures, FIG. 2 is a block diagram illustrating a computing system 200 including a computing infrastructure 210, a TTG 220 in a trusted execution environment 201, and associated systems in accordance with one or more embodiments. A system 200 includes computing infrastructure 210, TTG 220, and a plurality of workloads 270, and associated systems according to at least one embodiment.

Computing infrastructure 210 includes a plurality of hardware components or elements. The hardware components may include one or more processors (e.g., a processor 212), one or more accelerators (e.g., accelerator 213), one or more memory devices (e.g., memory device 214), one or more storage devices (e.g., a storage device 215), one or more network interfaces (e.g., a network interface 216), one or more network devices (e.g., a network device 217), and/or one or more other elements (e.g., other devices 218). Other devices 218 may include any suitable hardware components of a computing infrastructure, such as power supply elements, cooling elements, or other suitable components. In various embodiments, computing infrastructure 210 may represent any suitable combination of compute nodes, memory nodes, storage nodes, accelerator nodes, and networking nodes comprising various hardware components. For example, computing infrastructure 210 may comprise a datacenter, a communications service provider infrastructure (e.g., one or more portions of an Evolved Packet Core), or other suitable cluster of compute nodes. It should be noted that, other computing infrastructure implementations may also (or alternatively) contain one or more server nodes including any suitable combination of hardware components (e.g., 212-218)

Processor 212 may include one or more processors or processing devices including a central processing unit (CPU) (e.g., single core, multi-core), a microprocessor, embedded processor, a digital signal processor (DSP), a system-on-a-chip (SoC), a co-processor, or any other processing device to execute code. Processor 212 may include any number of processing elements, which may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. In at least one implementation, two or more processing units can be co-located on the integrated circuit (a single chip) to embody two or more corresponding cores. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet, a core and a hardware thread may be viewed by an operating system as individual logical processors, where the operating system is able to individually schedule operations on each logical processor.

An accelerator (e.g., accelerator 213) may include any suitable hardware and logic capable of accelerating certain workloads. An accelerator may be embodied as a processing device such as microprocessor that performs specialized processing tasks on behalf of one or more CPUs. Any specialized processing tasks may be performed by accelerators, such as graphics processing, cryptography operations, machine learning, vision processing, mathematical operations, TCP/IP processing, or other suitable functions. In particular embodiments, accelerator 213 may be coupled to one or more CPUs (e.g., processor 212) via a dedicated interconnect. In particular configurations of computing infrastructure 210, accelerators may comprise programmable logic gates. For example, accelerator 213 may be embodied as a field-programmable gate array (FPGA). Other types of accelerators that may be included in computing infrastructure 210 can include graphics processing units (GPUs), vision processing units (VPUs), deep learning processors (DLPs), and/or application-specific integrated circuits (ASICs), among others. In various configurations, an accelerator node may include multiple accelerators of the same type. In various other configurations, an accelerator node may include multiple accelerators of two or more different types. In some configurations, one or more accelerators may also be located on the same chip as a CPU (e.g., processor 212) in a compute node.

Memory device 214 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory device 214 may be used for short, medium, and/or long term storage of a compute server or disaggregated memory node. Memory device 214 may store any suitable data or information utilized by other elements of the computing infrastructure 210, including software embedded in a computer readable medium, and/or encoded logic incorporated in hardware or otherwise stored (e.g., firmware). Memory devices 214 may store data that is used by cores of processors 212, the cores of accelerators 213, and/or other processing elements of computing infrastructure 210. In some embodiments, memory device 214 may also comprise storage for instructions that may be executed by the cores of processors 212, cores of accelerators 213, and/or other processing elements of computing infrastructure 210 to provide functionality associated with computing infrastructure 210.

Memory devices 214 of a memory node may also store the results and/or intermediate results of the various calculations and determinations performed by processors 212, accelerators 213, and/or other processing elements of the computing infrastructure 210. In various embodiments, memory device 214 may comprise one or more modules of system memory (e.g., RAM) coupled to the processors and accelerators through memory controllers (which may be external to or integrated with the processors and/or accelerators). In various embodiments, one or more particular modules of memory may be dedicated to a particular processor, accelerator, other processing device, or may be shared across multiple processors 212, accelerators 213, or other processing devices.

Storage device 215 may include any suitable characteristics described above with respect to memory device 214. In particular embodiments, storage device 215 may comprise non-volatile memory such as one or more hard disk drives (HDDs), one or more solid state drives (SSDs), one or more removable storage devices, and/or other media. In particular embodiments, a storage device 215 is slower than a memory device 214, has a higher capacity, and/or is generally used for longer term data storage.

Network interface 216 may be used for the communication of signaling and/or data between elements of computing infrastructure 210 and one or more I/O devices, one or more networks coupled to computing infrastructure 210, and/or one or more devices coupled through such networks to the computing infrastructure. For example, network interface 216 may be used to send and receive network traffic such as data packets. In a particular embodiment, network interface 216 comprises one or more physical network interface controllers (NICs), also known as network interface cards, smart NICs, or network adapters. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of computing infrastructure 204 and another device coupled to the computing infrastructure through a network.

Network device 217 may include any suitable characteristics for routing data over a network in computing infrastructure 210 and/or for routing data outside computing infrastructure 210. For example, network devices in computing infrastructure 210 may include one or more of hubs, switches, routers, bridges, gateways, modems, and/or access points, among others. One or more network devices may couple to various ports (e.g., provided by NICs) of network interface 216 and may switch data between these ports and various elements of computing infrastructure 210 (e.g., via one or more Peripheral Component Interconnect Express (PCIe) lanes coupled to processors 212, accelerators 213, memory devices 214, and storage devices 215.

The trusted execution environment provides an enclave beyond which access to code and data is not permitted and within which code and data may be operated on in a decrypted format. Within this trusted execution environment, the TTG 220 is to perform aggregation using the aggregation logic 226, analytics using the analytics logic 224, and/or report generation using the report generation logic 222, and may call out a security policy in the form of a program that determines the manner in which data is to be made available to a tenant and or a CSP, using the security policy logic 225.

A TTG according to some embodiments provides a well defined interface to query a list of available telemetry data, to set security policies, to select report types, structures, and graphs for delivery to telemetry data consumers. A TTG may be integrated with the existing telemetry frameworks and tools and can serve to provide secure and controlled distribution of security sensitive telemetry.

From an architectural standpoint, a goal of some embodiments is to build a flexible telemetry data collection and analysis mechanism in the form of a TTG, telemetry data collectors (which may be in the same physical device as the TTG, or physically disaggregated from the TTG), and telemetry data ports (TDPs) at a component of the computing infrastructure (a TDP may be provided per component, that is, a CPU, FPGA, GPU, NIC or storage device may have its own dedicated TDP, or, there may be a TDP may serve a plurality of computing infrastructure components), that may be adapted to a particular environment, so that specific security policies can be programmed therein by a CSP and a tenant, for example in combination, or in a manner where standard security policies are implemented. Such policies may dictate how tenant data, tenant code and tenant telemetry data ought to be treated. Such policies may be tenant specified, based on an industry standard, based on a set of policies offered by a CSP, or a combination of the same. These security policies may be used to configure the security policy logic of TTG 220.

A TTG 220 operating in a trusted execution environment for a computing infrastructure as disclosed herein resolves many of the aforementioned issues (and more). A TTG 220 is configured for interpreting metadata and telemetry data of nodes, hardware components contained in the nodes, and interfaces of the hardware components in a computing infrastructure, for correlating with error cases observed in the computing infrastructure, and for learning/predicting which components are likely to encounter downtime before they crash, and it does so in a trusted execution environment that guards against malicious attacks.

In an embodiment, a TTG 220 can be configured to gather telemetry data from one or more computing infrastructure components (selected portions of a computing infrastructure), analyze the same, and generate reports based on the same, using security policies configured to the TTG, and it may do so as a measure of the health state of a selected portion of a computing infrastructure. The selected portion could include, for example, a node, a physical element (e.g., hardware component) of a node, or a cluster of nodes. A cluster of nodes could include any subset of the nodes in the computing infrastructure (e.g., nodes in a rack, a zone, a floor, a building, etc.) or all of the nodes in the computing infrastructure. In some embodiments, the TTG 220 allows an operator to zoom in for a micro assessment of a particular hardware component (e.g., a processor, an accelerator, a network device, a storage device, or memory device), zoom out to assess a node, and zoom progressively further out to assess various clusters of nodes (e.g., two nodes, three nodes, four nodes, etc.).

In one example, a health state of a selected portion of a computing infrastructure can indicate the reliability, resilience, and/or remaining lifetime of the selected portion. Notice of the health state of a selected portion of the computing infrastructure can create a proportional confidence level in the up-time and resilience of the nodes associated with that selected portion. Additionally, notice of the health state of a selected portion of a computing infrastructure can enable appropriate remediation and/or mitigation for any nodes associated with a selected portion that has a health state corresponding to a minimum reliability threshold, or reduced reliability threshold, or other similar threshold. Using the reliability thresholds, the TTG 220 can effectively predict failures in selected portions of a computing infrastructure and use that knowledge to allow mitigation of failures with appropriate preventive actions, enable redeployment of workloads, and initiate self-healing.

According to some embodiments, the telemetry data, for example all or a part of the telemetry data, obtained by way of telemetry data collectors (TDCs) 206, is to be encrypted by the TDCs. The TTG may collect telemetry data from one or more TDCs 206, analyze the same, determine a recommendation to the telemetry data consumer without revealing the actual raw data outside of the trusted execution environment.

In the embodiment depicted in FIG. 2, TTG 220 includes one or more processors 228, memories 229, communication interfaces 227, telemetry report generation logic 222, analytics logic (for example including a telemetry-based recommendation model) 224, security policy logic 225, and aggregation logic 226. Processor 228 may include any suitable combination of characteristics described herein with respect to processor 212, memory 229 may include any suitable combination of characteristics described herein with respect to memory device 214, communication interface 227 may include any suitable combination of characteristics described herein with respect to network interface 216 or one or more communication buses.

According to some embodiments the analytics logic 224 may aggregate and analyze data based on analytics as required by or for the telemetry data consumer. The analytics may be requested in the form of a request sent by a telemetry data consumer to the TTG, such as by a tenant or the CSP, or it may be triggered otherwise, Analysis by the TTG 220 may be performed in any manner. For example the trusted TDCs 206 may collect telemetry data from the CPU's relating to memory utilization by the CPUs as the CPUs execute one or more workloads. TTG 220 may analyze the telemetry data, and send information regarding such analysis to report generation logic 222, which would then generate a report and send the same to the CSP 203, making a recommendation in the report regarding memory resource allocation by the CPU. The report generation logic 222 may send such report out of the trusted execution environment 101 while not sending the raw telemetry data (telemetry data prior to processing by the TTG 220) outside of the trusted execution environment 101.

In at least one embodiment, analytics logic 224 may use artificial intelligence (AI) to determine recommendations for hardware components in a computing infrastructure based on telemetry data captured by the TTG 220. In one example, telemetry-based recommendation model 230 is a pre-trained machine learning forecasting model that can predict a health state for a hardware component of a node in a computing infrastructure. The health state may be predicted based on telemetry data associated with the hardware component and the node containing the hardware component. Telemetry-based recommendation model 230 may be pre-trained using any suitable type of machine learning where statistical methods and/or algorithms run on a training dataset to train a model to make predictions with new, possibly unknown, inputs. In one example, a training dataset can include telemetry data of various types of nodes and hardware components contained in the nodes of one or more computing infrastructures. For existing hardware in a computing infrastructure, telemetry-based recommendation model 230 could be pre-trained based on telemetry data (e.g., temperature readings, utilization metrics), metadata (e.g., age of components, type of components), and failure/error data collected from the computing infrastructure for a predefined time period. According to some embodiments an artificial intelligence model may be implemented within the TTG 220 for predictive purposes, for example to predict possible operations with respect to resource utilization and reallocation. For example the artificial intelligence model may serve to determine whether utilization or performance of certain components may be deteriorating or whether CERN components are being utilized overutilized. Such predictive reporting may allow the consumer of the telemetry data to take remedial measures comma for example by re allocating resources based on a report submitted to it by the TTG 220. Where the TTG 220 uses artificial intelligence/machine learning, it advantageously provides a comprehensive understanding the large amount of security sensitive telemetry data and their relationships.

It should be noted that any suitable type of machine learning algorithms may be used to train and produce a telemetry-based recommendation model. Examples of possible types of machine learning could include, but are not necessarily limited to, a classical machine learning system such a classical neural network, a dense and sparse system, a deep learning recommendation system, a graph analytics system, or deep learning with predictive analytics.

TTG 220 and/or telemetry data collectors 206 are operable to capture telemetry data from hardware components and their corresponding interfaces and from the nodes containing the hardware components and corresponding interfaces in the computing infrastructure 210. In some embodiments, the telemetry data is reported periodically to the TTG 220 and/or telemetry data collectors 206. In particular embodiments, a critical event such as an overloaded resource (e.g., core) or an excessive temperature may be reported prior to the normal interval for reporting telemetry data (e.g., a notification may be sent immediately upon detection). The trusted execution environment 201 may communicate obtained telemetry data or reports on the data to other elements of system 200, including to requestors of the telemetry information, The requestors of the telemetry information correspond to telemetry data consumers such as, by way of example, tenant 202 or cloud service provider (CSP) 203, or any other element within system 200. Upon a request by a telemetry data consumer, the TTG 220 and/or one or more telemetry data collectors 206 may query the appropriate node and/or hardware component to obtain real-time or most recently collected telemetry data, which can then be provided to TTG 220 for reporting telemetry information based thereon to one or more telemetry data consumer.

According to an embodiment, instead of using TDCs, the TTG 220 may read the data directly from the computing infrastructure components. Optionally, however, the more efficient design may involve the use of TDCs as described, where a TDC is to perform the low level task of interacting with the hardware resources to read the telemetry data and provide it to the TTG 220. TTG 220 is to have a specific identity that may be authenticated, and is to run inside a trusted execution environment, such as, for example, one including or similar to Intel SGX or ARM's Trustzone, allowing it to attest itself to the TDCs 206 in order to gain access to raw telemetry data.

Referring now to TDPs 212", 213", 214", 215", 216", 217" and 218", according to some embodiments, these may be implemented hardware blocks, or as hardware blocks with some software/firmware to run on the same, on the computing infrastructure components (e.g. CPU, FPGA, GPU, NIC, Storage, etc.) or compute resources that collect the telemetry data from various hardware subcomponents on that compute resource. There may be one or more TDPs on a given compute resource. The TDPs may have security lock mechanisms to turn them on or off by an authorized entity, such as a hardware vendor, a platform owner, or a tenant running the workload. Different TDPs may have different levels of authorization to turn them on or off based on the security policy that dictates the data that a TDP has access to. For example, according to an embodiment, a TDP that can access a tenant's security sensitive content can only be turned on by the tenant.

A TDP according to some embodiments may be configured to expose an interface for a collector of telemetry data, such as the TTG 220, to use. A TDP according to some embodiments may include processing circuitry, and a physical interface coupled to the processing circuitry, where the processing circuitry is to receive and decode a request to access telemetry data from a TDCs, such as TDCs 206. The processing circuitry of a TDP is further to authenticate a telemetry data collector 206 having sent a request for telemetry data as an entity with authorization to access the requested telemetry data, the processing circuitry to further provide the telemetry data to the data collector in encrypted format. The processing circuitry may be configurable according to security policies to be implemented. The processing circuitry may for example be provisioned with a key in a configurable manner in order to authenticate certificates for access to requested telemetry data. A TDC, in its request for access to telemetry data, may include a corresponding key based on the security policies with which it was configured.

TDCs 206 may be in the form of software modules or a combination of hardware blocks and software/firmware. As noted above, each telemetry data collector may be associated with a given computing infrastructure component in the network. A TDC according to some embodiments may be in the form of a software or firmware module that is to implement an authentication or validation algorithm to a consumer of telemetry data, such as a CSP, in order to ensure that the consumer validates itself as an authorized requester of telemetry data, for example by presenting a certificate. Upon authentication of the requester at a TDC associated with a given computing infrastructure component, the TDC is to then release the requested data to the TTG, and is able to stop any software or malware that is rogue to access the associated TDP and siphon away sensitive telemetry data directly.

According to some embodiments, TDCs 206 may all be included within a same computing infrastructure component, such as a CPU, a FPGA, a GPU, a storage device, a NIC, etc., or they may be disaggregated and disposed and/or within respective computing infrastructure components of the system 200.

According to some embodiments, TDCs 206 may be included in the trusted execution environment 201 along with the TTG 220 as shown in FIG. 2, or the TDCs could be outside of the trusted execution environment 201 and communicate with the TTG using cryptographic messages.

One or more TDCs 206, according to some embodiments, may validate the requester of telemetry data as being authorized to access such data, and may further send the requested telemetry data to the TTG. According to one embodiment, a TDC may decrypt encrypted telemetry data sent to it by a component, and encrypt the telemetry data again prior to sending the same to the TTG, especially where the TDC is not in the trusted execution environment with the TTG.

The TDCs 206 are to presents attestation data, such as a signed certificate, from a known authority (such as a telemetry data consumer authorized to access telemetry information based on telemetry data to be collected) to the TDPs in order to gain access to the raw telemetry data to be provided to them through the TDPs. Telemetry data may be read by the TDCs from the TDPs via Memory Mapped Input/Output (MMIO) or Direct Memory Access (DMA) transfers. The TDCs and TDPs may be configured with security policies to ensure that the telemetry data is transferred from the TDPs to the TDCs securely, without risk of leakage or loss of integrity. This could be achieved, for example through the use of cryptography or other access control to protect the transfers.

Some embodiments envisage the use of multiple TDCs that specialize in gathering telemetry data for respective types of computing infrastructure components. For example, some embodiments include one or more dedicated TDCs for CPUs, one or more dedicated TDCs for CPUs FPGA, one or more dedicated TDCs for GPUs, one or more dedicated TDCs for NICs, one or more dedicated TDCs for storage circuitries, etc.

According to one embodiment there may be a TDC associated with each component after network, for example with each system and or device of the network or with each part of the system such as a TDCs 206 for each of a CPU GPU and FPGA a memory etc. According to an embodiment a TDCs 206 may collect telemetry data from all subcomponents of the system up until the time he is provided to the TTG, at which point it may be decrypted.

TDCs 206 may further include processing circuitry, and physical interface coupled to the processing circuitry, where the processing circuitry is adapted to send a request for access to telemetry data to a TDP, for example by presenting a certificate, collect telemetry data from the TDP, and send telemetry data in an encrypted form to the telemetry governor. According to one embodiment, the TDCs 206 me potentially further encrypt the telemetry data before relaying it to the telemetry governor, or it may decrypt the telemetry data after receiving the same, an encrypted with a different key prior to relaying it to the telemetry governor. According to some embodiments delete elementary data collector may further process the telemetry data before sending the same to the TTG, such As for example by filtering the data, by providing analytics on the data, or buy otherwise transforming the data before sending the same. In this manner, some of the functionality of the TTG may be disaggregated to one or more TDCs.

To send telemetry data to the TTG, a TDCs 206 may use any suitable cryptographic algorithms, such ss for example AES 256.6. According to one embodiment the cryptographic algorithm used to encrypt the telemetry data from the TDP to a TDC 206 may be different from the cryptographic algorithm used to send the telemetry data from the TDC 206 to the TTG.

Figure 3:
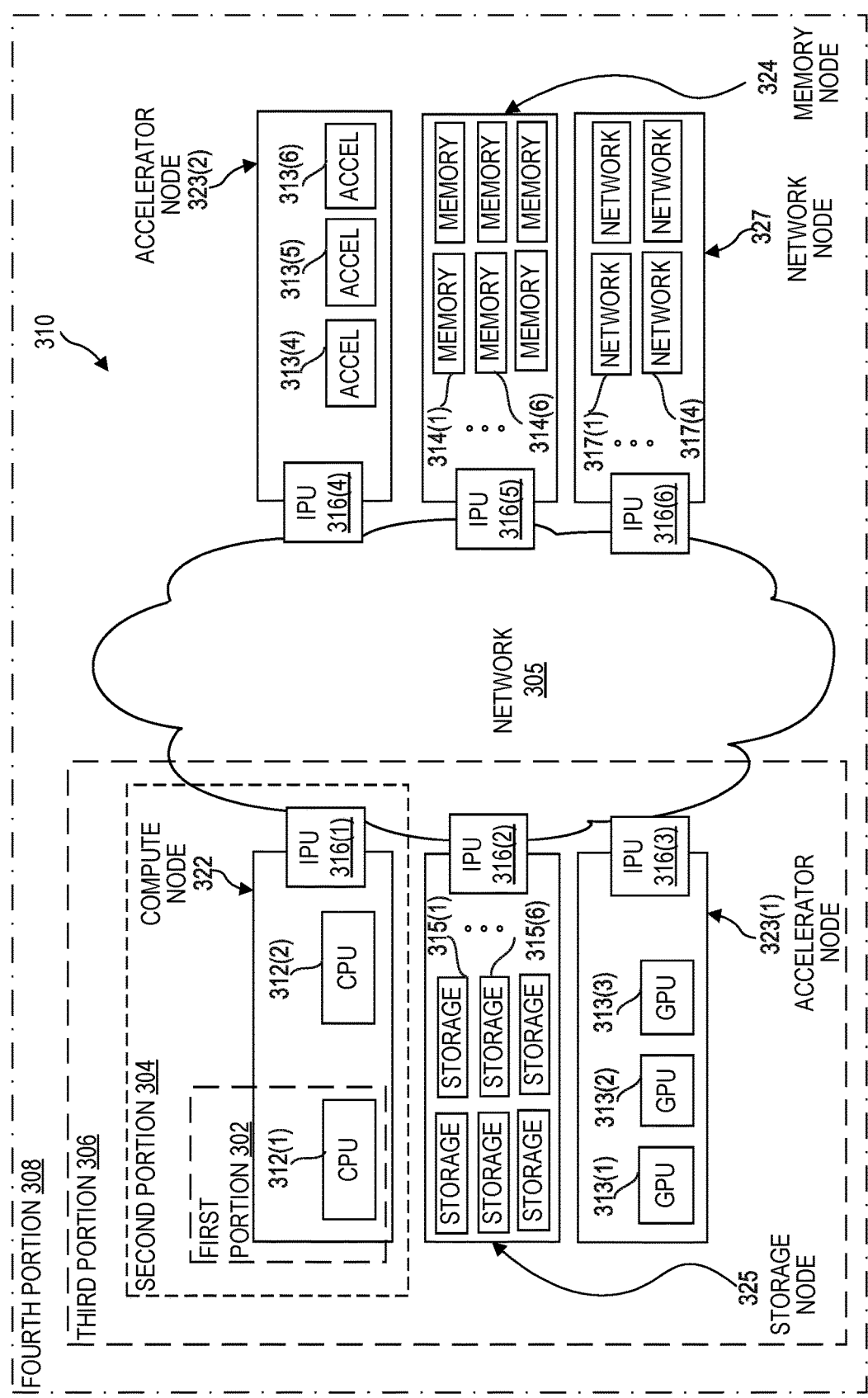
FIG. 3 is a block diagram illustrating a simplified example implementation of a computing infrastructure with disaggregated elements according to some embodiments.

Referring briefly to FIG. 3, a simplified example implementation of a computing infrastructure 310 with disaggregated elements, including general-purpose processors, heterogeneous accelerators, storage devices, network devices, and infrastructure processing units (IPUs). Computing infrastructure 310 may have any suitable characteristics as described with reference to computing infrastructure 210 and its hardware components 212-218. In computing infrastructure 310, hardware components that are typically incorporated in a compute server, are instead disaggregated from dissimilar hardware components and provisioned in separate nodes with like hardware components.

In this example, computing infrastructure 310 includes a compute node 322, a GPU accelerator node 323(1), another accelerator node 323(2), a memory node 324, a storage node 325, and a network node 327. Compute node 322 includes processors such CPUs 312(1) and 312(2). Storage node 325 includes storage devices 315(1)-315(6). GPU accelerator node 323(1) includes GPUs 313(1)-313(3). Another accelerator node 323(2) includes the same or other types of accelerators 313(4)-313(6) such as, for example, VPUs, FPGAs, ASICs, other xPUs, a combination of different types of accelerators, etc. Memory node 324 includes memory devices 314(1)-314(6). Network node 327 includes network devices (e.g., 217) such as network devices 317(1)-317(4). The hardware components of computing node 322, accelerator nodes 323(1) and 323(2), memory node 324, storage node 325, and network node 327 may have any suitable characteristics described with reference to computing infrastructure 210, or other characteristics. Also, the nodes (e.g., 322, 323(1), 323(2), 324, 325, and 327) of computing infrastructure 310 can communicate over a network 305 via respective infrastructure processing units (e.g., IPUs 316(1)-316(6)), which can each include one or more network interface controllers (NICs).

Referring still to FIG. 3, the elements of computing infrastructure 310 may be coupled together in any suitable manner, such as through a bus or other network (e.g., network 305). A bus may include any suitable interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus, or any other suitable communication mechanism.

Referring back to FIG. 2, any of the elements of system 200 may be coupled together in any suitable manner such as through one or more networks (e.g., 305). A network may be any suitable network or combination of one or more networks using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, the TTG 220 may communicate through a network with telemetry consumers requesting the performance of processing operations (e.g., workloads) to be performed by computing infrastructure 210.

One or more physical elements may be combined into a logical machine. For example, a first logical machine may be configured to include a processor 212, a memory device 214, and a network interface 216. In another example, a second logical machine may be configured to include an accelerator 213, a memory device 214, a storage device 215, and a network interface 216. A logical machine may include any combination and quantity of physical elements of computing infrastructure 210. Thus, computing infrastructure 210 may contain a plurality of configured logical machines, with each logical machine configured to contain one or more physical elements.

In one possible configuration of computing infrastructure 210, a logical machine may include a plurality of disaggregated physical elements, where like elements exist on the same nodes as shown by way of example in FIG. 2. In various embodiments, a hardware element of a node may reside on a circuit board. In some embodiments, the circuit board is installed in a chassis, rack, or other suitable structure that comprises multiple nodes coupled together through a network, which may comprise, e.g., a rack or backplane stack.

Workloads 270 may include applications, services, microservices, containers, and/or virtual machines. For example, workload A may comprise a single virtual machine or multiple virtual machines operating together (e.g., a virtual network function (VNF) or a service function chain (SFC)), one or more container instances, and/or other suitable workload. Various embodiments may include a variety of types of guest systems present on the same logical machines or physical elements. In some embodiments, a workload 270 may be generated in response to system 200 receiving a request over a network from a remote computing device.

A virtual machine may emulate a computer system with its own dedicated hardware. A virtual machine may run a guest operating system on top of a hypervisor. The physical elements of a logical machine (e.g., processor 212, memory device 214, storage device 215, network interface 216, etc.) may be virtualized such that it appears to the guest operating system that the virtual machine has its own dedicated components. A virtual machine may include a virtualized NIC (vNIC), which is used by the virtual machine as its network interface. A vNIC may be assigned a media access control (MAC) address, thus allowing multiple virtual machines to be individually addressable in a network.

A hypervisor (also known as a virtual machine monitor) may comprise logic to create and run guest systems. The hypervisor may present guest operating systems run by virtual machines with a virtual operating platform (i.e., it appears to the virtual machines that they are running on separate physical nodes when they are actually consolidated onto a single hardware platform) and manage the execution of the guest operating systems. Services of the hypervisor may be provided by virtualizing in software or through hardware assisted resources that require minimal software intervention, or both. Multiple instances of a variety of guest operating systems may be managed by a hypervisor.

Telemetry data can be collected from each hardware component on a node. For example, telemetry can be collected from processors 212 (e.g., CPUs 312(1)-312(2) in compute node 322), accelerators 213 (e.g., GPUs 313(1)-313(3) in accelerator node 323(1), accelerators 313(4)-313(6) in accelerator node 323(2)), memory devices 214 (e.g., memory devices 314(1)-314(6) in memory node 324), storage devices 215 (e.g., storage devices 315(1)-315(6) in storage node 325), and network devices 217 (e.g., network devices 317(1)-317(4) in network node 327). Telemetry data can also be collected from each interface that connects a hardware component to one or more other hardware components. By way of example, telemetry data can be collected from a CPU and its corresponding interface contained in a compute node. The CPU can have internal utilization and error metrics (e.g., for cores and caches) as well as interface utilization and error metrics (e.g., for double data rate (DDR) computer bus, point-to-point processor interconnect, peripheral component interconnect express (PCIe), and others).

Any suitable telemetry data that can be used to assess the health of a computing infrastructure may be collected. In particular, telemetry data that characterizes usage and other information relevant to the health and reliability of a hardware component, an interface of the hardware component, and/or a node containing the hardware component may be collected. For example, the telemetry data may include, but is not necessarily limited to, usage data, utilization metrics (e.g., the percentage of available resources being used), error metrics, power information (e.g., power consumed during designated time periods and/or workloads), and/or temperature information (e.g., ambient air temperature) near the components of the computing infrastructure. One or more of these different types of telemetry data may be obtained for each of the hardware component, the interface of the hardware component, and the node containing the hardware component and its interface.

As specific (but non-limiting) examples, the telemetry data may include processor cache usage, current memory bandwidth usage, and current I/O bandwidth use by each guest system or part thereof (e.g., thread, application, service, etc.) and/or bandwidth of each I/O device (e.g., Ethernet device or hard disk controller). Further telemetry data could include the number of memory accesses per unit of time, and/or the total duration of utilization over the life of a device (e.g., CPU, GPU, VPU, FPGA, ASIC, network processor, switch, hub, router, SSD, HDD, RAM, ROM, NIC, etc.). Utilization metrics can measure the percentage of available resources being used per process (e.g., percentage of total computing power of a node limited to the percentage utilized by a process) or in the aggregate (e.g., percentage of the total computing power used by an individual processor of a node.)

Additional telemetry data may include an amount of available memory space or bandwidth, an amount of available processor cache space or bandwidth. In addition, temperatures, currents, and/or voltages may be collected from various points of the computing infrastructure, such as at one or more locations of each core, one or more locations of chipsets associated with the processors in a computing node, one or more locations of chipsets associated with accelerators in an accelerator node, or other suitable locations of the computing infrastructure 210 (e.g., air intake and outflow temperatures may be measured).

Further a health state as obtained from telemetry data can be based on telemetry data including a current level of redundancy used for maintaining different parts of a computing infrastructure in a functioning state. For example, the level of redundancy of particular hardware components within a node (e.g., number of redundant or backup CPUs in a compute node, number of redundant SSD devices in a memory node, number of GPUs in a GPU accelerator node, etc.), and/or the level of redundancy of particular nodes (e.g., compute node, memory node, accelerator node, network node, storage node) within a rack, floor, building, zone, etc. of the computing infrastructure or within the entire computing infrastructure, etc. may be obtained. Such telemetry data can be an indicator of the health state of the system and can be used to determine a health state for a selected portion of the infrastructure. In one example, the level of redundancy for a node or hardware component in a node could be updated whenever a redundancy is used. In these scenarios, the redundancy use could be recorded in error log 270 so that the reduced level of redundancy is obtained as telemetry data to be used for determining a health state.

Yet a further health state based on telemetry data can be based on telemetry data including resource utilization per application running on a node and/or particular hardware component. For example, the frequency that an application accesses a particular resource (e.g., system memory, main memory, network devices for remote communications, etc.) may collected as part of telemetry data.

In an embodiment, either the TTG 220 or the TDCs 206 may include a performance monitor, e.g., Intel® performance counter monitor (PCM), to detect, for processors 212 or accelerators 213, processor utilization, core operating frequency, and/or cache hits and/or misses. TTG 220 and/or TDCs 206 may be further configured to detect an amount of data written to and read from, e.g., memory controllers associated with processor 212, accelerator 213, memory device 214, storage device 215, and/or network device 217. In another example, TTG 220 and/or TDCs 206 may include one or more Java performance monitoring tools (e.g., jvm-stat, a statistics logging tool) configured to monitor performance of Java virtual machines, UNIX® and UNIX-like performance monitoring tools (e.g., vmstat, iostat, mpstat, ntstat, kstat) configured to monitor operating system interaction with physical elements.

TTG 220 and/or TDCs 206 are operable to capture telemetry data from hardware components and their corresponding interfaces and from the nodes containing the hardware components and corresponding interfaces of the computing infrastructure 210. In some embodiments, the telemetry data is reported periodically to the TTG 220 and/or TDCs 206. In particular embodiments, a critical event such as an overloaded resource (e.g., core) or an excessive temperature may be reported prior to the normal interval for reporting telemetry data (e.g., a notification may be sent immediately upon detection). An advantage of using the trusted execution environment including the TTG is the mitigation of risk associated with malicious attacks to gain access to telemetry data.

Any suitable metadata 260 that can be used to determine a health state may be obtained. In particular, metadata describing a node or a particular hardware component contained in the node may be collected. For example, metadata can pertain to compute nodes (e.g., compute node 322), accelerator nodes (e.g., accelerator nodes 323(1)-323(2)), memory nodes (e.g., memory nodes 324), storage nodes (e.g., storage nodes 325), network nodes (e.g., network nodes 327), and/or any other nodes in a computing infrastructure. Metadata may also pertain to particular hardware components such as processors 212 accelerators 213 (e.g., GPUs 313(1)-313(3), accelerators 313(4)-313(6)), memory devices 214 (e.g., memory devices 314(1)-314(6)), storage devices 215 (e.g., storage device 315(1)-315(6)), and network devices 217 (e.g., network device 317(1)-317(4)). In more traditional computing infrastructures, metadata pertaining to the various servers and their associated hardware components may be collected.

Telemetry data can be collected and stored in any suitable storage within the TTG 220. In an embodiment, some or all telemetry data may be collected by the one or more TDCs 206 and provided to TTG 220. In some implementations, the hardware components and/or nodes of computing infrastructure 210 may be queried for the telemetry data, and the TDCs 206 may be used to collect telemetry data associated with the various hardware components and/or nodes of computing infrastructure 210.

As specific (but non-limiting) examples, telemetry data as used herein may include metadata associated with a node (or server) can include age of the node (e.g., installation date, manufacturing date), types of hardware components in the node (e.g., types of processors, memory, storage, accelerators, etc.), and/or identification of installed software and possibly the date of the software installation. Metadata can also pertain to particular hardware components in a node. For example, the type of hardware component (e.g., manufacturer, product identifier, number of cores, size of cache, size of storage devices, size of memory, etc.). For replaceable hardware components in a node, metadata can be collected that includes the age of the hardware components if it differs from the age of the node itself. Metadata can also include location information (e.g., geographical location and/or indoor positioning within a data center). For example, geographical location information could include a physical address (e.g., street, city, state, country). Indoor positioning location information could include rack number, rack configuration (e.g., number of compute nodes), socket identification, node identification, etc.

The telemetry data and metadata in the training dataset may include any suitable telemetry data and metadata as previously described herein. The training dataset can include telemetry data, metadata, and failure data for hardware components or devices such as processors (e.g., various types of single-core and multi-core CPUs, microprocessors, embedded processors, digital signal processor (DSP), a system-on-a-chip (SoC), a co-processor, or any other processing device to execute code), accelerators (e.g., microprocessors that perform specialized processing tasks such as graphics processing (GPUs), cryptography operations, machine learning (DLPs), vision processing (VPUs), mathematical operations (FPGAs), TCP/IP processing, and other suitable functions, ASICs, and/or FPGAs), memory devices (e.g., magnetic media, tape drives, optical media, RAM, ROM, EPROM, EEPROM, flash memory, removable media, and any other memory component), storage devices (e.g., SSD, HDD, etc.), network interfaces (e.g., NICs, wireless NICs, vNICs, smart NICs, network adapters, IPUs, etc.), network devices (e.g., network processors, switches, hubs, routers, gateways, bridges, modems, access points, etc.), and interfaces of the hardware component for communicating with other components. The training dataset can also include telemetry data, metadata, and failure data for nodes (e.g., compute nodes, accelerator nodes, memory nodes, storage nodes, network nodes, server nodes) that contain the hardware components.

The telemetry-based recommendation model 230 can predict a health risk at the micro-level for any selected hardware component of a node in a computing infrastructure. Additionally, analytics logic 224 can determine recommendations for individual nodes and any macro-level cluster of nodes in a computing infrastructure. For example, analytics logic 224 could determine the health state of a selected portion of a computing infrastructure for the entire computing infrastructure, for a cluster of any number of nodes, or for a particular node, and may, based on the model 230, determine whether the selected portion is at a health risk (e.g. decreased performance, power usage or temperature expected to increase beyond a desired threshold, etc.). A selected cluster of nodes for which a health state could be determined may include, for example, one or more racks of nodes (e.g., rack of compute nodes), one or more zones within the computing infrastructure, a cluster of any number of similar nodes, a cluster of any number of dissimilar nodes, cluster of nodes in a building, or all of the nodes in the computing infrastructure.

In at least one embodiment, analytics logic 224 can determine the health state of a selected portion of a computing infrastructure for a node based on the health states determined by telemetry-based recommendation model 230 for hardware components contained in the node. Similarly, analytics logic 224 can determine the health state of a selected portion of a computing infrastructure for a cluster of nodes based on the health states determined for the nodes that form the cluster. In at least one embodiment, the health states for nodes and for clusters of nodes can be determined using weighted averages. Any suitable criteria can be used to appropriately weight the health states of hardware components being used to determine the health state of a selected portion of a computing infrastructure of a node, or to appropriately weight the health states of nodes being used to determine the health state of a selected portion of a computing infrastructure of a cluster of those nodes. In another example, linear regression may be used to predict the health states of a node based on the health states of the hardware components in the node. Similarly, linear regression may be used to predict the health state of a cluster of nodes based on the health states of the nodes in the cluster.

Computing infrastructure physical elements within infrastructure 210 may be combined into logical machines and managed accordingly, for example by an orchestrator, i.e., to configure the logical machines. Placement of the workloads onto the logical machines may further be managed, i.e., to select a logical machine on which to place a respective workload and to manage logical machine sharing by a plurality of workloads. An orchestrator to implement the above function may correspond to a cloud management platform, e.g., OpenStack® (cloud operating system), CloudStack® (cloud computing software) or Amazon Web Services (AWS). Various operations that may be performed by an orchestrator include selecting one or more nodes for the instantiation of a virtual machine, container, or other workload and directing the migration of a virtual machine, container, or other workload from particular physical elements or logical machines to other physical elements or logical machines. Any suitable logic may perform the above orchestration functions.

Some examples of determining the health state of a selected portion of a computing infrastructure and an appropriate recommendation (as performed by the TTG) based on the health state determined from telemetry metadata, will now be described. Generally, if a health state determined for a selected portion of a computing infrastructure indicates that the selected portion is unhealthy (e.g., based on a minimum reliability threshold), then the TTG can recommend to the consumer that preventive action be taken including triggering or causing migration of any existing workloads running on the selected portion (e.g., a hardware component such as a CPU, GPU, VPU, ASIC, or FPGA, a compute node or accelerator node, or a cluster of at least some compute nodes and/or accelerator nodes) to a healthier portion of the computing infrastructure before a hardware crash causes an outage and/or data loss. Similarly, the TTG may send a recommendation to the telemetry data consumer that preventative action be taken to trigger or cause migration of any data stored in the selected portion (e.g., a hardware component such as an SSD, HDD, RAM, or ROM, a storage node or memory node, or a cluster of at least some storage nodes and/or memory nodes) to a healthier portion of the computing infrastructure before a hardware crash causes an outage and/or data loss. In addition, the TTG may send a recommendation that the new workloads be prevented from being placed on that selected portion and/or new data may be prevented from being stored in that selected portion until appropriate mitigation has improved the health state of the hardware component, node, or cluster of nodes. Also, the TTG may send a recommendation that preventive maintenance may be triggered to replace hardware components and/or nodes in the selected portion of the infrastructure and/or to add a suitable amount of redundancy to ensure the required uptime is achieved.

In another scenario, if a health state declines, e.g., to an average health state based on a reduced reliability threshold, the TTG may send a recommendation that preventive actions be taken to, for example, schedule preventive maintenance to add suitable amount of redundancy to ensure the required uptime for the selected portion of the computing infrastructure is achieved. In addition, critical and/or long-running workloads on the selected portion may be redeployed to other, healthier portions of the computing infrastructure. Additionally, the TTG may send a recommendation to load balance workloads running in the selected portion to maintain the operating temperature and average utilization below a desired limit.

In another example, a preventive action as recommended by the TTG may include self-healing. One form of self-healing could include post package repair, e.g., on a storage node or memory node. For example, when a health state of a hardware component indicates that the hardware component has minimum reliability, a determination may be made by the TTG as to whether a post package repair has been performed on the node containing the hardware component. If it has not been performed, then a preventive action as recommended by the TTG may include scheduling a post package repair for the node.

Another form of self-healing could include mitigation actions as recommended by the TTG that attempt to increase the life of a node when, for example, a health state of a node indicates a low reliability and/or a change in reliability. For example, if the health state indicates that the health state of the node has been reduced, a determination can be made by the TTG as to whether the health state declined faster than expected for that type of node, thus shortening the expected overall lifetime for the node. In this scenario, preventive actions to attempt to extend the life of the node as recommended by the TTG may include, for example, reducing the usage of the node. For example, the TTG may recommend load balancing to shift some of the workload to less utilized nodes. By recommending decreasing the usage of the current node, the TTG can help decrease the power and utilization to a desired limit and thus, the operating temperature of the node can also be decreased. Such preventive actions may help extend the life of the node.

In another example, if the health state of a hardware component or a node indicates that the hardware component or node is unhealthy (e.g., the health state meets a minimum reliability threshold), then another preventive action that could be recommended by the TTG is to activate a back-up hardware component or node to replace the unhealthy hardware component or node. A determination can be made by the TTG as to whether a back-up or redundant hardware component or node is available. If so, then it could be activated and workloads and/or data storage could be migrated from the unhealthy hardware component or node to the newly activated hardware component or node.

In yet another example, a scheduling of a preventive maintenance for the hardware component or node by a technician could be recommended by the TTG. If the hardware component cannot be repaired by a technician, then it may be replaced. If a hardware component is not replaceable and there are no redundancies of the hardware component in the node, then the TTG may recommend replacing the node (or activating a back-up node).

Figure 4:
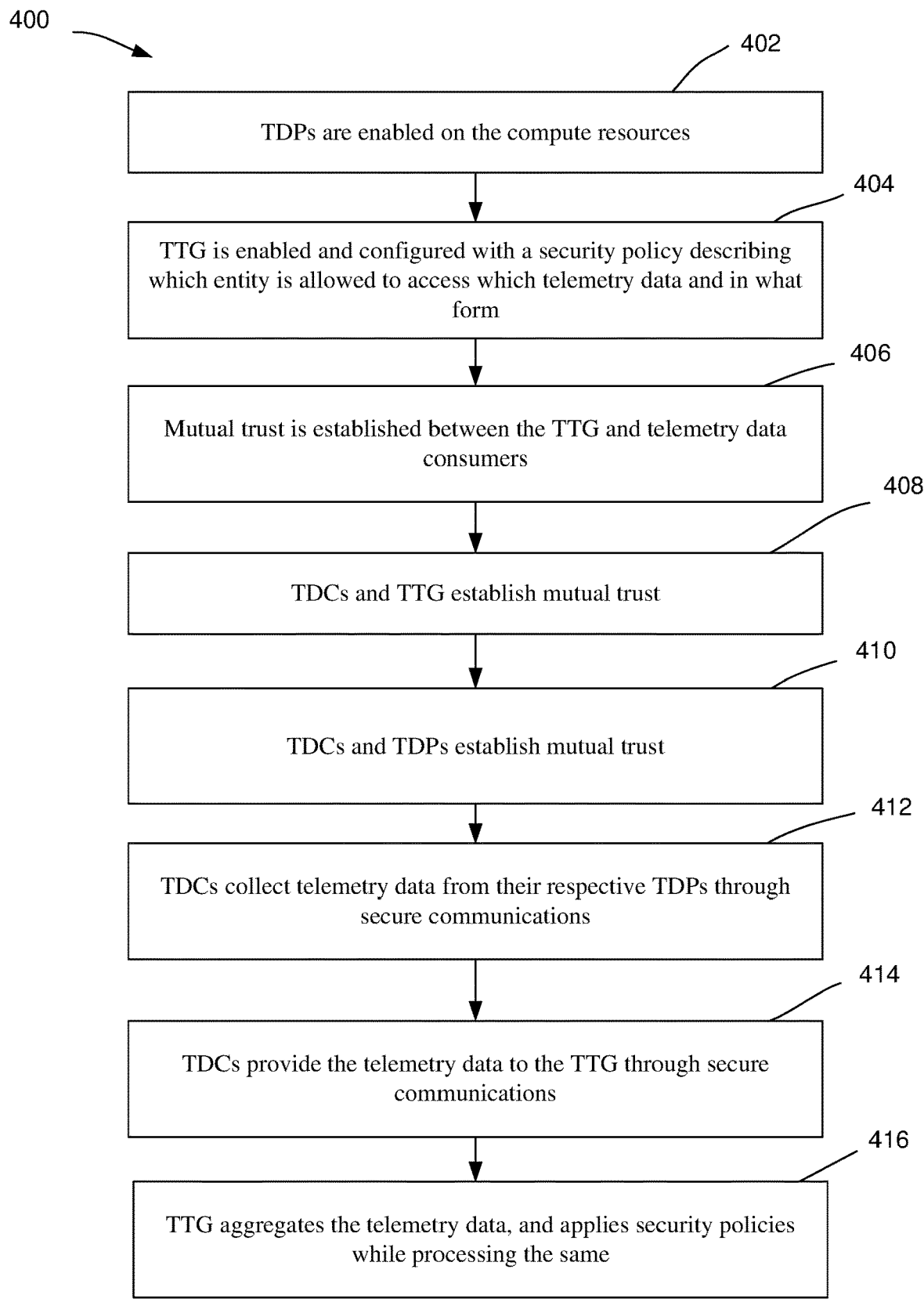
FIG. 4 is a block diagram illustrating an example flow according to some embodiments.

Reference is now made to FIG. 4, which shows an example flow 400 according to some embodiments.

At operation 402, TDPs on the compute resources are enabled by an authorized entity, such as a CSP, and configured to allow authorized TDCs 206 to access them.

At operation 404, the TTG is launched on the system platform and is configured securely with a security policy describing which entity is allowed to access which telemetry data and in what form. Each consumer may define its own security policy for telemetry data associated with it. For example, on a partially reconfigurable FPGA, the tenant may define the security policy for telemetry associated with the tenant's hardware design on the FPGA. Furthermore, there may be a pre-defined, standard, default security policy for all of the consumes' telemetry data.

At operation 406, telemetry data consumers and the TTG establish mutual trust. The TTG may verify authorization certificates presented by telemetry data consumers, which should include information on what telemetry information each particular consumer is allowed to access. The telemetry data consumers may verify attestation data presented by the TTG. The TTG and telemetry data consumers may establish respective shared secret keys between them, which may be used to cryptographically protect their communications.

At operation 408, the TDCs and TTG establish mutual trust, for example by exchanging attestation data proving their authenticity and integrity. The TDCs and TTG may set up shared secret keys to protect communication between them.

At operation 410, the TDCs establish trust with TDPs, for example by way of the TDPs verifying authorizations of the TDCs. Establishing trust between the TDCs and TDPs may be implemented by a trusted firmware agent on behalf of the TDPs if the required verification flows are too long to be implemented in hardware. According to one embodiment, cryptographic keys may be established to protect the communication between TDCs and TDPs. Alternate mechanisms such as the use of hardware based access controls may also be used according to an embodiment to protect DMA and/or MMIO interface between the TDCs and the TDPs.

At operation 412, the TDCs may collect telemetry data from their respective TDPs by communicating with the TDP securely.

At operation 414, the TDCs may provide the telemetry data to the TTG over a secure channel.

At operation 418, the TTG may aggregate the telemetry data received from the computing infrastructure components, and apply security policies to the same while processing the data. For example, the TTG may filter out some of the telemetry data, transform other telemetry data, or provide raw telemetry data to the consumer per the configured security policies. The TTG may use intelligent machine learning models to analyze large amounts of telemetry data from multiple computing infrastructure components, and generate intelligent reports based on the same. The TTG may sends the telemetry information to the consumer over a secure channel.

Figure 5:
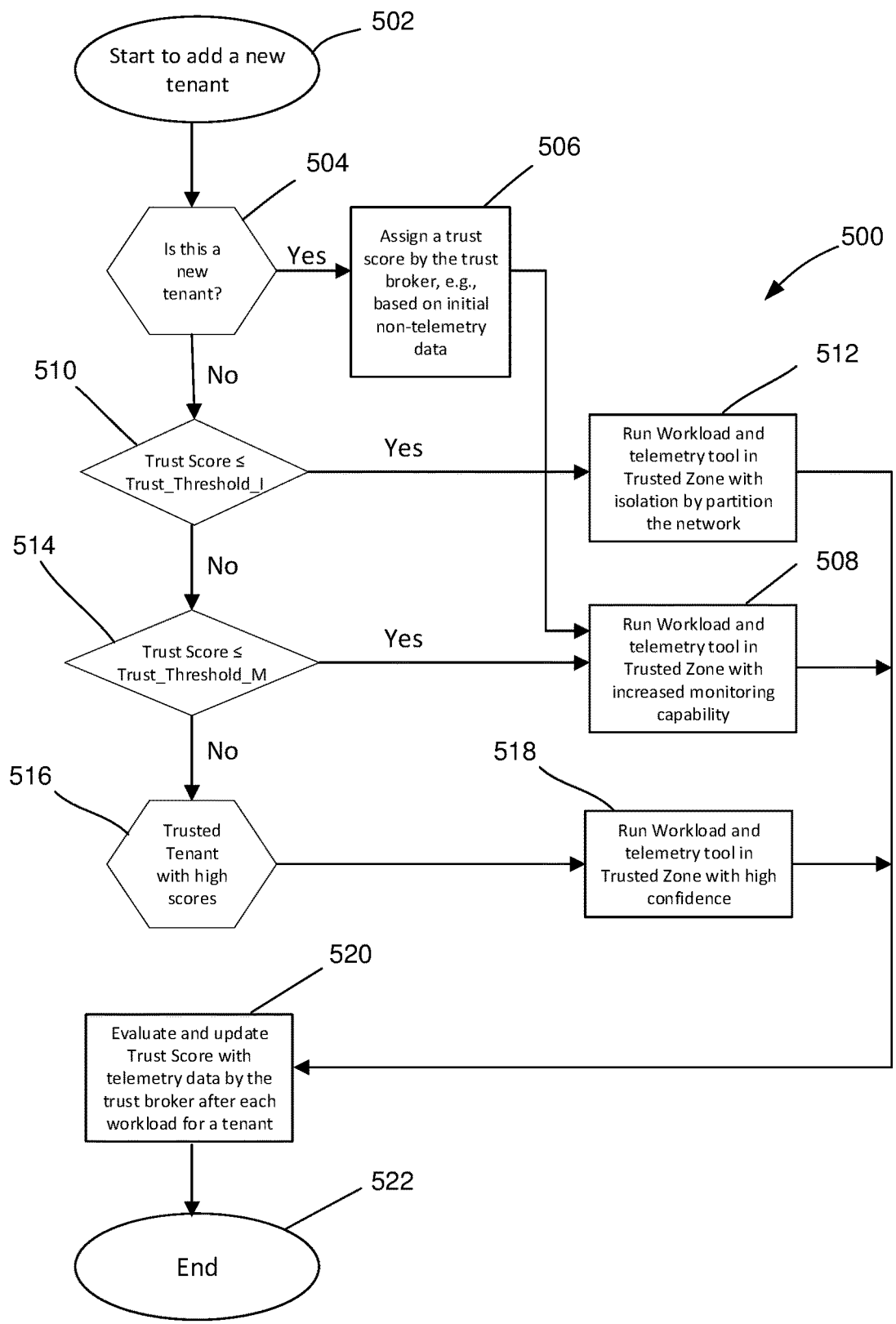
FIG. 5 is a block diagram illustrating an example flow for trust scoring according to some embodiments.

Referring now to FIG. 5, according to an embodiment as shown in flow 500, telemetry data may be used to create trust scoring. A trust scoring system based on telemetry processing and regulatory compliance may be built and used by multiple entities according to an embodiment. For example, trust scoring may be implemented by the TTG, such as by the analysis logic within the TTG. Telemetry data consumers may implement security policies that dictate using the telemetry data to create a tenant trust scoring system with respect to risk level associated with the tenants. A cloud or edge customer, or a TTG, may evaluate the telemetry data related to system security properties and adherence to regulatory compliance to establish a trust scoring system. For example the analytics logic within the TTG may perform such an evaluation, and the report generation logic may generate a report including a trust score and send the report to the telemetry data consumer. According to some embodiments, a report from the TTG to the consumer may include a trust score relating to a tenant, for example as computed by the analytics logic within the TTG, which trust score the consumer may use in order to make additional decisions regarding the tenant. According to other embodiments, a report form the TTG to the consumer may include a recommendation based on the trust score, such as recommended decisions regarding the tenant, to be caused to be implemented by the consumer.

Computation of the tenant trust score may be based on telemetry collected when running tenant's workloads and apply weights based on other factors such as tenant application history with the cloud services, IP addresses, business location, financial score, etc.

The tenant trust score, according to some embodiments, could be used to make decisions or recommendations such as whether to isolate the system where the tenants' workloads is running and/or how much monitoring to perform on execution of the workloads. For example, a CSP may use the trust score to determine what is the risk level to its data center resources from a particular tenant and make decisions such as 1) whether to increase monitoring of a tenant's activities, for which a Trust_Threshold_M may be defined; 2) isolate the cluster within which the tenant is located by partitioning the network to reduce impact to rest of the data center in case the tenant workload goes rogue, for which a value Trust_Threshold_I, may be defined, where Trust_Threshold_M>Trust_Threshold_I.

Some embodiments include providing trusted zone infrastructure dedicated to use for the tenants with a high tenant trust score, the trusted zone infrastructure being for reducing vulnerability to various malicious attacks. Based on a high trust score, workloads with long running times can be grouped into a highly secured domain or trusted zone infrastructure, including CPUs, XPUs, power supplies, network access, accelerators, and storage. After each service, the authorized TTG or trusted telemetry broker residing in a customer's architecture may update the tenant's trust score for a future use as a reference.

A service trust scoring system may, according to some embodiments, be built based on regulatory compliance levels such as NIST 80053, FIPS 140-3 levels, SSAE-16, AT-101, ISO, Privacy Shield, etc. The regulatory compliance can include but is not limited to Infrastructure Security Telemetry (IST), Virtualization and Container Security Telemetry (VCST), Application Security Telemetry (AST), and Data Security Protection and Encryption Telemetry (DSPET), Virus Screening Telemetry (VST), etc. The IST may start from raw hardware telemetry, network Telemetry, storage telemetry, etc. In a trusted zone infrastructure, according to an embodiment, third party accredited testing labs may assess regulatory compliances to provide certification for each compliance.

In a trust score system according to some embodiments, trust scores may be recorded, for example by the telemetry data consumer or by the TTG or both, as part of security incident reporting/logging, notification, responding. The trust scores may be accessed and/or recovered at a later time as a result.

Referring now more particularly to flow 500 of FIG. 5, the process of evaluating whether a new tenant is to be added is launched at operation 502. All of the operations in flow 500 may be performed at one entity, such as by a telemetry data consumer, a TTG, or another node within a system, such as system 200 of FIG. 2, or, in the alternative, different operations in flow 500 may be performed by different entities, such as some of the operations being performed by a TTG, some by another node in the system.

At operation 504, a determination is made as to whether the tenant is a new tenant.

If the answer from operation 504 is yes, at operation 506, a trust score is assigned by a trust broker (which may be embodied as a software or firmware entity running on any node within a system, such as system 200), for example based on initial non-telemetry data, or based on prior telemetry data stored for the tenant, or a combination of both.

At operation 508, after assignment of a trust score at operation 506, a workload and a telemetry tool may be run on the tenant in a trusted zone of the network, where an enhanced telemetry monitoring of the tenant may take place with respect to trust. The telemetry tool may correspond to telemetry software, and may be run, for example, by a TTG, or combination TTG, TDC and TDP as explained above.

If the answer from operation 504 is no, at operation 510, a determination is made as to whether the trust score for the tenant is less than or equal to a first trust threshold, Trust_Threshold_I.

If the answer from operation 510 is yes, at operation 512, based on the trust score, the network including the tenant may be partitioned into an isolated trusted zone for running a workload on the tenant, and for running a telemetry tool on the workload and tenant, and the workload may be run within the trusted zone. The telemetry tool may correspond to telemetry software, and may be run, for example, by a TTG, or combination TTG, TDC and TDP as explained above.

If the answer from operation 510 is no, at operation 514, a determination is made as to whether the trust score for the tenant is less than or equal to a first trust threshold, Trust_Threshold_M.

If the answer from operation 514 is yes, the flow moves to operation 508, where a workload and a telemetry tool may be run on the tenant in a trusted zone of the network, where an enhanced telemetry monitoring of the tenant may take place with respect to trust.

If the answer from operation 514 is no, at operation 516, a determination is made that the tenant is a trusted tenant with high scores.

At operation 518, after the determination has been made at operation 516, the workload and telemetry tool may be run in the trusted zone with high confidence.

Operations 512, 508 and 518 would be followed by operation 520, where an evaluation and updates is made to the trust score, using telemetry data by the trust broker. Operation 512 may take place after each workload implemented for the tenant, or after a plurality of workload implemented for the tenant.

The end may happen at 522, or operation 520 may loop back to operation 502 for each tenant until all workloads have been run.

Figure 6:
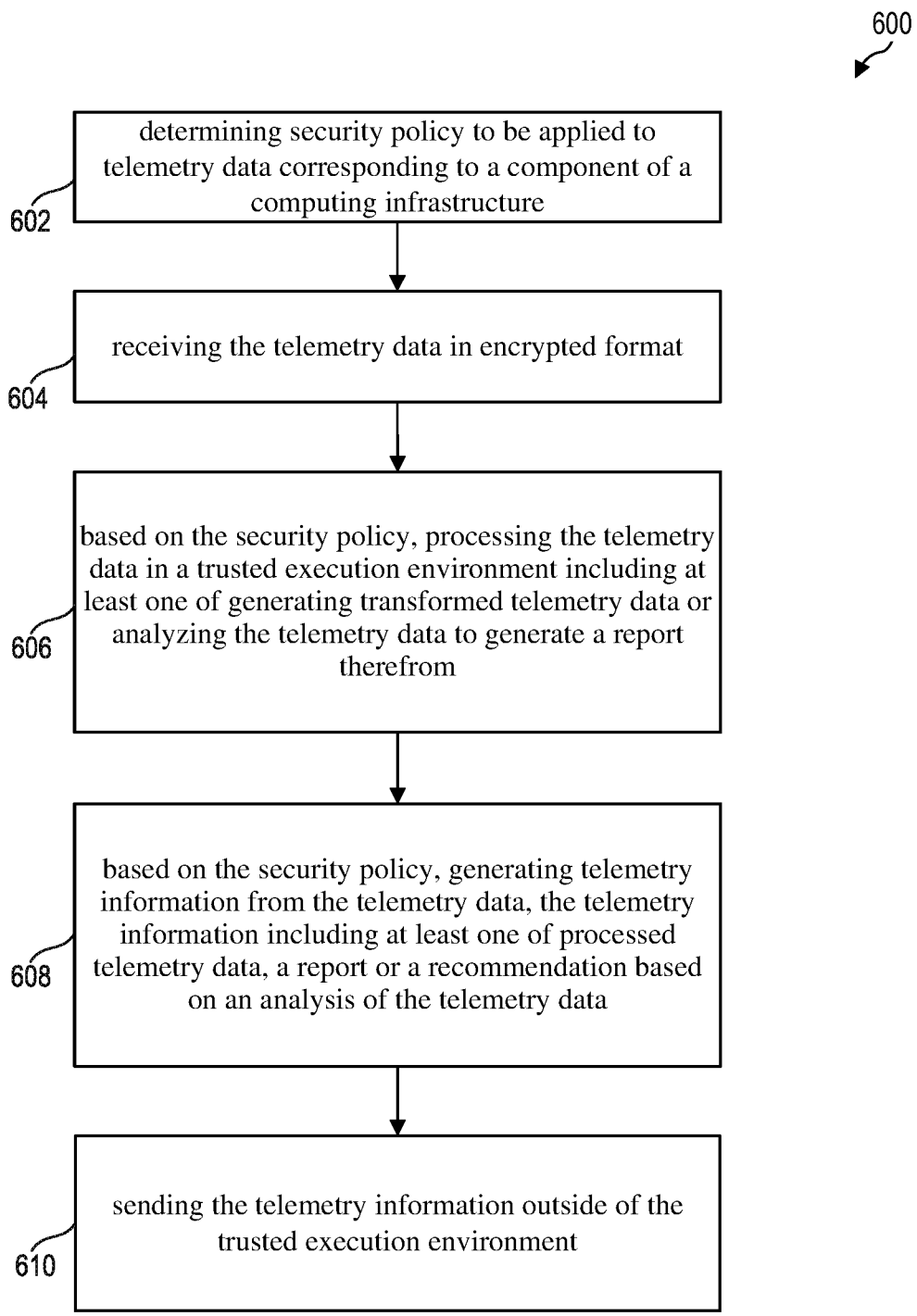
FIG. 6 is a block diagram illustrating an example of a process to be performed by a TTG according to some embodiments Like reference numbers and designations in the various drawings indicate like elements.

Referring now to FIG. 6, a flow 600 to be implemented by a TTG is shown according to an embodiment. At operation 602, the process includes determining security policy to be applied to telemetry data corresponding to a component of a computing infrastructure; at operation 604, the process includes receiving the telemetry data in encrypted format; at operation 606, the process includes based on the security policy, processing the telemetry data in a trusted execution environment including at least one of generating transformed telemetry data or analyzing the telemetry data to generate a report therefrom; at operation 608 the process includes based on the security policy, generating telemetry information from the telemetry data, the telemetry information including at least one of processed telemetry data, a report or a recommendation based on an analysis of the telemetry data; and at operation 610, the process includes sending the telemetry information outside of the trusted execution environment.

"Logic" (e.g., as found in analytics logic 224, 322(1)-322(m), score decision logic 234, 334(1)-334(m), scheduling logic 232, or in other references to logic in this application) may refer to hardware, firmware, software or any suitable combination thereof to perform one or more functions. In various embodiments, logic may include a microprocessor or other processing device or element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

A module or engine as used herein (e.g., TTG 220, TDC 206, TDP 112, refers to any combination of hardware, software, and/or firmware. As an example, a module or engine may include hardware, such as a micro-controller, associated with a non-transitory medium to store code adapted to be executed by the micro-controller. Therefore, reference to a module or engine, in one embodiment, refers to the hardware, which is specifically configured to recognize and/or execute the code to be held on a non-transitory medium. Furthermore, in another embodiment, use of a module or engine refers to the non-transitory medium including the code, which is specifically adapted to be executed by the microcontroller to perform predetermined operations. And as can be inferred, in yet another embodiment, the term module or engine (in this example) may refer to the combination of the microcontroller and the non-transitory medium. Often module or engine boundaries that are illustrated as separate commonly vary and potentially overlap. For example, a first and a second module or engine may share hardware, software, firmware, or a combination thereof, while potentially retaining some independent hardware, software, or firmware. In various embodiments, a module or engine may include any suitable logic.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'configured to,' 'capable of/to,' and/or 'operable to,' in one embodiment, refers to some apparatus, logic, hardware, and/or element designed in such a way to enable use of the apparatus, logic, hardware, and/or element in a specified manner. Note that use of to, configured to, capable of/to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states, such as health states of hardware components, nodes, and clusters of nodes.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

As used herein, unless expressly stated to the contrary, use of the phrase 'at least one of' refers to any combination of the named items, elements, conditions, operations, claim elements, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Reference throughout this specification to "one embodiment" or "an embodiment" means that a particular feature, structure, or characteristic described in connection with the embodiment is included in at least one embodiment of the present disclosure. Thus, the appearances of the phrases "one embodiment" or "an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to embodiments in accordance with this specification. The system, apparatus, method, and machine readable storage medium embodiments can include one or a combination of the following examples:

EXAMPLES

Example 1 includes one or more machine readable storage media comprising instructions stored thereon, the instructions when executed by a machine, cause the machine to implement a trusted telemetry governor (TTG) inside a trusted execution environment by: determining security policy to be applied to telemetry data corresponding to component of a computing infrastructure; receiving the telemetry data in encrypted format; based on the security policy: processing the telemetry data including at least one of generating transformed telemetry data or analyzing the telemetry data to generate a report therefrom; and generating telemetry information from the telemetry data, the telemetry information including at least one of processed telemetry data, a report or a recommendation based on an analysis of the telemetry data; and sending the telemetry information outside of the trusted execution environment.

Example 2 includes the subject matter of Example 1, wherein the security policy is to specify a correlation between an identity or a type of a telemetry data consumer on one hand, and at least one of a type or a form of telemetry data to be accessed by the telemetry data consumer.

Example 3 includes the subject matter of Example 1, wherein sending the telemetry information outside of the trusted execution environment includes sending the telemetry information to a telemetry data consumer, the machine to further verify an authorization certificate presented by the telemetry data consumer prior to sending the telemetry data to the telemetry data consumer, the authorization certificate based on the security policy.

Example 4 includes the subject matter of Example 3, the machine to further send attestation data to the telemetry data consumer based on the security policy.

Example 5 includes the subject matter of Example 4, the machine to further establish a secret key between the TTG and the telemetry data consumer and to verify the authorization certificate based on the secret key.

Example 6 includes the subject matter of Example 1, wherein receiving the telemetry data includes receiving the telemetry data from a telemetry data collector (TDC), the TDC corresponding to an entity to directly receive the telemetry data from the component, the machine to further verify an authorization certificate presented by the TDC prior to receiving the telemetry data, the authorization certificate based on the security policy.

Example 7 includes the subject matter of Example 6, the machine to further send attestation data to the TDC based on the security policy.

Example 8 includes the subject matter of Example 6, the machine to further establish a secret key between the TTG and the TDC and to verify the authorization certificate based on the secret key.

Example 9 includes the subject matter of Example 1, the machine to further receive the telemetry data directly from the component.

Example 10 includes the subject matter of Example 1, wherein sending the telemetry information including sending the telemetry information in encrypted format.

Example 11 includes the subject matter of Example 1, wherein the machine is to configure the TTG with a plurality of security policies based on telemetry consumer needs, and to adjust a security policy configured to the TTG and associated with a telemetry consumer based on a security policy adjustment request.

Example 12 includes the subject matter of Example 1, wherein the machine is to process the telemetry data and generate the telemetry information by implementing an artificial intelligence model on the telemetry data.

Example 13 includes the subject matter of Example 1, wherein the recommendation includes at least one of: a recommendation to migrate a workload running on the component to a different component of the computing infrastructure; a recommendation to take preventative action to cause migration of data stored in the component to the different component of the computing infrastructure; a recommendation to prevent new workloads from being placed on the component; a recommendation to prevent new data from being placed on the component; a recommendation to split the workload running on the component between the component and the different component; a recommendation to schedule maintenance or repair on the component; or a recommendation to replace the component.

Example 14 includes the subject matter of Example 1, wherein the telemetry data is first telemetry data, and the component is a first component, the machine to further: determine a plurality of security policies to be applied to respective ones of a plurality of sets of telemetry data including the first telemetry data, the sets corresponding to respective ones of a plurality of components including the first component; receive the sets of telemetry data in encrypted format; based on each of the plurality of security policies: process a corresponding set of the sets of telemetry data, processing including at least one of generating a transformed set of telemetry data or analyzing the corresponding set to generate a report therefrom; and generate corresponding telemetry information from the corresponding set, the corresponding telemetry information from the corresponding set including at least one of processed telemetry data, a report or a recommendation based on an analysis of the telemetry data; and send the corresponding telemetry information outside of the trusted execution environment.

Example 15 includes the subject matter of Example 1, wherein the component is a component of a tenant, the machine to further: determine a trust score for the tenant, the trust score corresponding to the tenant and to a workload running on the tenant; determine whether the trust score for the tenant is less than or equal to a first trust threshold, Trust_Threshold_I; determine whether the trust score for the tenant is less than or equal to a second trust threshold, Trust_Threshold_M; in response to a determination that the trust score for the tenant is less than or equal to the first trust threshold, run the workload on the tenant in a trusted zone partitioned from a network that includes the tenant; and in response to a determination that the trust score for the tenant is more than the first trust threshold and less than or equal to the second trust threshold, run the workload on the tenant in a trusted zone with increased monitoring.

Example 16 includes an apparatus of a computing node of a network, the apparatus including a memory storing logic to implement a trusted telemetry governor (TTG) inside a trusted execution environment, and one or more processors coupled to the memory and to execute the logic to: determine security policy to be applied to telemetry data corresponding to a component of a computing infrastructure; receive the telemetry data in encrypted format; based on the security policy: process the telemetry data including at least one of generating transformed telemetry data or analyzing the telemetry data to generate a report therefrom; and generate telemetry information from the telemetry data, the telemetry information including at least one of processed telemetry data, a report or a recommendation based on an analysis of the telemetry data; and send the telemetry information outside of the trusted execution environment.

Example 17 includes the subject matter of Example 16, wherein the security policy is to specify a correlation between an identity or a type of a telemetry data consumer on one hand, and at least one of a type or a form of telemetry data to be accessed by the telemetry data consumer.

Example 18 includes the subject matter of Example 16, wherein sending the telemetry information outside of the trusted execution environment includes sending the telemetry information to a telemetry data consumer, the one or more processors to further verify an authorization certificate presented by the telemetry data consumer prior to sending the telemetry data to the telemetry data consumer, the authorization certificate based on the security policy.

Example 19 includes the subject matter of Example 18, the one or more processors to further send attestation data to the telemetry data consumer based on the security policy.

Example 20 includes the subject matter of Example 19, the one or more processors to further establish a secret key between the TTG and the telemetry data consumer and to verify the authorization certificate based on the secret key.

Example 21 includes the subject matter of Example 16, wherein receiving the telemetry data includes receiving the telemetry data from a telemetry data collector (TDC), the TDC corresponding to an entity to directly receive the telemetry data from the component, the one or more processors to further verify an authorization certificate presented by the TDC prior to receiving the telemetry data, the authorization certificate based on the security policy.

Example 22 includes the subject matter of Example 21, the one or more processors to further send attestation data to the TDC based on the security policy.

Example 23 includes the subject matter of Example 21, the one or more processors to further establish a secret key between the TTG and the TDC and to verify the authorization certificate based on the secret key.

Example 24 includes the subject matter of Example 16, the one or more processors to further receive the telemetry data directly from the component.

Example 25 includes the subject matter of Example 16, wherein sending the telemetry information including sending the telemetry information in encrypted format.

Example 26 includes the subject matter of Example 16, the one or more processors to configure the TTG with a plurality of security policies based on telemetry consumer needs, and to adjust a security policy configured to the TTG and associated with a telemetry consumer based on a security policy adjustment request.

Example 27 includes the subject matter of Example 16, the one or more processors to further process the telemetry data and generate the telemetry information by implementing an artificial intelligence model on the telemetry data.

Example 28 includes the subject matter of Example 16, wherein the recommendation includes at least one of: a recommendation to migrate a workload running on the component to a different component of the computing infrastructure; a recommendation to take preventative action to cause migration of data stored in the component to the different component of the computing infrastructure; a recommendation to prevent new workloads from being placed on the component; a recommendation to prevent new data from being placed on the component; a recommendation to split the workload running on the component between the component and the different component; a recommendation to schedule maintenance or repair on the component; or a recommendation to replace the component.

Example 29 includes the subject matter of Example 16, wherein the telemetry data is first telemetry data, and the component is a first component, the one or more processors to further: determine a plurality of security policies to be applied to respective ones of a plurality of sets of telemetry data including the first telemetry data, the sets corresponding to respective ones of a plurality of components including the first component; receive the sets of telemetry data in encrypted format; based on each of the plurality of security policies: process a corresponding set of the sets of telemetry data, processing including at least one of generating a transformed set of telemetry data or analyzing the corresponding set to generate a report therefrom; and generate corresponding telemetry information from the corresponding set, the corresponding telemetry information from the corresponding set including at least one of processed telemetry data, a report or a recommendation based on an analysis of the telemetry data; and send the corresponding telemetry information outside of the trusted execution environment.

Example 30 includes the subject matter of Example 16, wherein the component is a component of a tenant, the one or more processors to further: determine a trust score for the tenant, the trust score corresponding to the tenant and to a workload running on the tenant; determine whether the trust score for the tenant is less than or equal to a first trust threshold, Trust_Threshold_I; determine whether the trust score for the tenant is less than or equal to a second trust threshold, Trust_Threshold_M; in response to a determination that the trust score for the tenant is less than or equal to the first trust threshold, run the workload on the tenant in a trusted zone partitioned from a network that includes the tenant; and in response to a determination that the trust score for the tenant is more than the first trust threshold and less than or equal to the second trust threshold, run the workload on the tenant in a trusted zone with increased monitoring.

Example 31 includes a method to be performed by an apparatus of a computing node of a network to implement a trusted telemetry governor (TTG) inside a trusted execution environment, the method including: determining security policy to be applied to telemetry data corresponding to a component of a computing infrastructure; receiving the telemetry data in encrypted format; based on the security policy: processing the telemetry data including at least one of generating transformed telemetry data or analyzing the telemetry data to generate a report therefrom; and generating telemetry information from the telemetry data, the telemetry information including at least one of processed telemetry data, a report or a recommendation based on an analysis of the telemetry data; and sending the telemetry information outside of the trusted execution environment.

Example 32 includes the subject matter of Example 31, wherein the security policy is to specify a correlation between an identity or a type of a telemetry data consumer on one hand, and at least one of a type or a form of telemetry data to be accessed by the telemetry data consumer.

Example 33 includes the subject matter of Example 31, wherein sending the telemetry information outside of the trusted execution environment includes sending the telemetry information to a telemetry data consumer, the method further including verifying an authorization certificate presented by the telemetry data consumer prior to sending the telemetry data to the telemetry data consumer, the authorization certificate based on the security policy.

Example 34 includes the subject matter of Example 33, the method further including sending attestation data to the telemetry data consumer based on the security policy.

Example 35 includes the subject matter of Example 34, the method further including establishing a secret key between the TTG and the telemetry data consumer and to verify the authorization certificate based on the secret key.

Example 36 includes the subject matter of Example 31, wherein receiving the telemetry data includes receiving the telemetry data from a telemetry data collector (TDC), the TDC corresponding to an entity to directly receive the telemetry data from the component, the method further including * verify an authorization certificate presented by the TDC prior to receiving the telemetry data, the authorization certificate based on the security policy.

Example 37 includes the subject matter of Example 36, the method further including sending attestation data to the TDC based on the security policy.

Example 38 includes the subject matter of Example 36, the method further including establishing a secret key between the TTG and the TDC and to verify the authorization certificate based on the secret key.

Example 39 includes the subject matter of Example 31, the method further including receiving the telemetry data directly from the component.

Example 40 includes the subject matter of Example 31, wherein sending the telemetry information including sending the telemetry information in encrypted format.

Example 41 includes the subject matter of Example 31, the method including configuring the TTG with a plurality of security policies based on telemetry consumer needs, and adjusting a security policy configured to the TTG and associated with a telemetry consumer based on a security policy adjustment request.

Example 42 includes the subject matter of Example 31, the method including processing the telemetry data and generating the telemetry information by implementing an artificial intelligence model on the telemetry data.

Example 43 includes the subject matter of Example 31, wherein the recommendation includes at least one of: a recommendation to migrate a workload running on the component to a different component of the computing infrastructure; a recommendation to take preventative action to cause migration of data stored in the component to the different component of the computing infrastructure; a recommendation to prevent new workloads from being placed on the component; a recommendation to prevent new data from being placed on the component; a recommendation to split the workload running on the component between the component and the different component; a recommendation to schedule maintenance or repair on the component; or a recommendation to replace the component.

Example 44 includes the subject matter of Example 31, wherein the telemetry data is first telemetry data, and the component is a first component, the method further including: determining a plurality of security policies to be applied to respective ones of a plurality of sets of telemetry data including the first telemetry data, the sets corresponding to respective ones of a plurality of components including the first component; receiving the sets of telemetry data in encrypted format; based on each of the plurality of security policies: processing a corresponding set of the sets of telemetry data, processing including at least one of generating a transformed set of telemetry data or analyzing the corresponding set to generate a report therefrom; and generating corresponding telemetry information from the corresponding set, the corresponding telemetry information from the corresponding set including at least one of processed telemetry data, a report or a recommendation based on an analysis of the telemetry data; and sending the corresponding telemetry information outside of the trusted execution environment.

Example 45 includes the subject matter of Example 31, wherein the component is a component of a tenant, the method further including: determining a trust score for the tenant, the trust score corresponding to the tenant and to a workload running on the tenant; determining whether the trust score for the tenant is less than or equal to a first trust threshold, Trust_Threshold_I; determining whether the trust score for the tenant is less than or equal to a second trust threshold, Trust_Threshold_M; in response to a determination that the trust score for the tenant is less than or equal to the first trust threshold, running the workload on the tenant in a trusted zone partitioned from a network that includes the tenant; and in response to a determination that the trust score for the tenant is more than the first trust threshold and less than or equal to the second trust threshold, running the workload on the tenant in a trusted zone with increased monitoring.

Example 46 includes one or more machine readable storage media comprising instructions stored thereon, the instructions when executed by a machine, to cause the machine to implement a telemetry data collector (TDC) by: determining security policy to be applied to telemetry data corresponding to a component of a computing infrastructure; presenting an authorization certificate to a telemetry data port (TDP) of the component, the authorization certificate based on the security policy; in response to verification of the authorization certificate by the TDP, receiving the telemetry data in encrypted format from the TDP; and sending at least one of the telemetry data or intermediate telemetry information based on the telemetry data to a trusted telemetry governor (TTG) within a trusted execution environment, the intermediate telemetry information based on a processing of the telemetry data by the machine, the TTG to process the at least one of the telemetry data or the intermediate telemetry information to generate telemetry information based thereon, and to send the telemetry information to a telemetry data consumer.

Example 47 includes the subject matter of Example 46, wherein the encrypted format is a first encrypted format, and wherein sending the at least one of the telemetry data or intermediate telemetry information including sending the at least one of the telemetry data or intermediate telemetry information in a second encrypted format, the second encrypted format identical to or different from the first encrypted format.

Example 48 includes the subject matter of Example 46, the machine to further send attestation data to the TDP based on the security policy.

Example 49 includes the subject matter of Example 46, the machine to further establish a secret key between the TDC and the TDP and to verify the authorization certificate based on the secret key.

Example 50 includes the subject matter of Example 46, wherein the machine is to configure the TDC with a plurality of security policies based on telemetry consumer needs, and to adjust a security policy configured to the TDC and associated with a telemetry consumer based on a security policy adjustment request.

Example 51 includes the subject matter of Example 46, wherein the telemetry data is first telemetry data, and the component is a first component, the machine to further: determine a plurality of security policies to be applied to respective ones of a plurality of sets of telemetry data including the first telemetry data, the sets corresponding to respective ones of a plurality of components including the first component; receive the sets of telemetry data in encrypted format from the plurality of TDPs; based on each of the plurality of security policies: process a corresponding set of the sets of telemetry data to generate corresponding intermediate telemetry information from the corresponding set; and send the corresponding telemetry information to the TTG.

Example 52 includes the subject matter of Example 46, wherein the machine is to operate in the trusted execution environment.

Example 53 includes an apparatus of a component of a computing network, the apparatus including a memory storing logic, and one or more processors coupled to the memory to execute the logic to implement a telemetry data collector (TDC) by: determining security policy to be applied to telemetry data corresponding to a component of a computing infrastructure; presenting an authorization certificate to a telemetry data port (TDP) of the component, the authorization certificate based on the security policy; in response to verification of the authorization certificate by the TDP, receiving the telemetry data in encrypted format from the TDP; and sending at least one of the telemetry data or intermediate telemetry information based on the telemetry data to a trusted telemetry governor (TTG) within a trusted execution environment, the intermediate telemetry information based on a processing of the telemetry data by the one or more processors, the TTG to process the at least one of the telemetry data or the intermediate telemetry information to generate telemetry information based thereon, and to send the telemetry information to a telemetry data consumer.

Example 54 includes the subject matter of Example 53, wherein the encrypted format is a first encrypted format, and wherein sending the at least one of the telemetry data or intermediate telemetry information including sending the at least one of the telemetry data or intermediate telemetry information in a second encrypted format, the second encrypted format identical to or different from the first encrypted format.

Example 55 includes the subject matter of Example 53, the one or more processors to further send attestation data to the TDP based on the security policy.

Example 56 includes the subject matter of Example 53, the one or more processors to further establish a secret key between the TDC and the TDP and to verify the authorization certificate based on the secret key.

Example 57 includes the subject matter of Example 53, wherein the one or more processors are to configure the TDC with a plurality of security policies based on telemetry consumer needs, and to adjust a security policy configured to the TDC and associated with a telemetry consumer based on a security policy adjustment request.

Example 58 includes the subject matter of Example 53, wherein the telemetry data is first telemetry data, and the component is a first component, the one or more processors to further: determine a plurality of security policies to be applied to respective ones of a plurality of sets of telemetry data including the first telemetry data, the sets corresponding to respective ones of a plurality of TDPs of components including the first component; receive the sets of telemetry data in encrypted format from the plurality of TDPs; based on each of the plurality of security policies: process a corresponding set of the sets of telemetry data to generate corresponding intermediate telemetry information from the corresponding set; and send the corresponding telemetry information to the TTG.

Example 59 includes the subject matter of Example 53, wherein the apparatus is to operate in the trusted execution environment.

Example 60 includes the subject matter of Example 53, wherein apparatus is part of the component.

Example 61 includes a method to be performed by an apparatus of a component of a computing network to implement a telemetry data collector (TDC), the method including: determining security policy to be applied to telemetry data corresponding to a component of a computing infrastructure; presenting an authorization certificate to a telemetry data port (TDP) of the component, the authorization certificate based on the security policy; in response to verification of the authorization certificate by the TDP, receiving the telemetry data in encrypted format from the TDP; and sending at least one of the telemetry data or intermediate telemetry information based on the telemetry data to a trusted telemetry governor (TTG) within a trusted execution environment, the intermediate telemetry information based on a processing of the telemetry data by the apparatus, the TTG to process the at least one of the telemetry data or the intermediate telemetry information to generate telemetry information based thereon, and to send the telemetry information to a telemetry data consumer.

Example 62 includes the subject matter of Example 61, wherein the encrypted format is a first encrypted format, and wherein sending the at least one of the telemetry data or intermediate telemetry information including sending the at least one of the telemetry data or intermediate telemetry information in a second encrypted format, the second encrypted format identical to or different from the first encrypted format.

Example 63 includes the subject matter of Example 61, the method further including sending attestation data to the TDP based on the security policy.

Example 64 includes the subject matter of Example 61, the method further including establishing a secret key between the TDC and the TDP and to verify the authorization certificate based on the secret key.

Example 65 includes the subject matter of Example 61, wherein the machine is to configure the TDC with a plurality of security policies based on telemetry consumer needs, and to adjust a security policy configured to the TDC and associated with a telemetry consumer based on a security policy adjustment request.

Example 66 includes the subject matter of Example 61, wherein the telemetry data is first telemetry data, and the component is a first component, the method further including: determining a plurality of security policies to be applied to respective ones of a plurality of sets of telemetry data including the first telemetry data, the sets corresponding to respective ones of a plurality of components including the first component; receiving the sets of telemetry data in encrypted format from the plurality of TDPs; based on each of the plurality of security policies: processing a corresponding set of the sets of telemetry data to generate corresponding intermediate telemetry information from the corresponding set; and sending the corresponding telemetry information to the TTG.

Example 67 includes the subject matter of Example 61, wherein the method is to be implemented in the trusted execution environment.

An Example Y1 provides an apparatus, the apparatus comprising means for performing the method of any one of the Examples 31-45 and 61-67.

Example Y2 comprises the subject matter of Example Y1, and the means for performing the method comprises at least one processing device and at least one memory element.

Example Y3 comprises the subject matter of Example Y2, and the at least one memory element comprises machine readable instructions that when executed, cause the apparatus to perform the method of any one of Examples 31-45 and 61-67.

Example Y4 comprises the subject matter of any one of Examples Y1-Y3, and the apparatus is a computing system.

Example Y5 comprises the subject matter of Example Y4, and the computer system is a system-on-a-chip.

An Example X1 provides at least one machine readable storage medium comprising instructions that, when executed, realize a system or implement a method as in any one of Examples 31-45 and 61-67.

What is claimed is:

1. One or more machine readable storage media comprising instructions stored thereon, the instructions when executed by a machine, cause the machine to implement a trusted telemetry governor (TTG) inside a trusted execution environment by:
   determining security policy to be applied to telemetry data corresponding to component of a computing infrastructure, the security policy to indicate a correlation between, on one hand, a type of telemetry data consumer, and on another hand, at least one of a type or a form of telemetry data to be made accessible to the telemetry data consumer;
   receiving the telemetry data in encrypted format;
   based on the security policy:
   processing the telemetry data including at least one of generating transformed telemetry data or analyzing the telemetry data to generate a report therefrom; and
   generating telemetry information from the telemetry data, the telemetry information including at least one of processed telemetry data, a report or a recommendation based on an analysis of the telemetry data; and
   sending the telemetry information outside of the trusted execution environment.

2. The one or more machine readable storage media of claim 1, wherein sending the telemetry information outside of the trusted execution environment includes sending the telemetry information to the telemetry data consumer, the machine to further verify an authorization certificate presented by the telemetry data consumer prior to sending the telemetry data to the telemetry data consumer, the authorization certificate based on the security policy.

3. The one or more machine readable storage media of claim 2, the machine to further send attestation data to the telemetry data consumer based on the security policy.

4. The one or more machine readable storage media of claim 3, the machine to further establish a secret key between the TTG and the telemetry data consumer and to verify the authorization certificate based on the secret key.

5. The one or more machine readable storage media of claim 1, wherein receiving the telemetry data includes receiving the telemetry data from a telemetry data collector (TDC), the TDC corresponding to an entity to directly receive the telemetry data from the component, the machine to further verify an authorization certificate presented by the TDC prior to receiving the telemetry data, the authorization certificate based on the security policy.

6. The one or more machine readable storage media of claim 5, the machine to further send attestation data to the TDC based on the security policy.

7. The one or more machine readable storage media of claim 5, the machine to further establish a secret key between the TTG and the TDC and to verify the authorization certificate based on the secret key.

8. The one or more machine readable storage media of claim 1, the machine to further receive the telemetry data directly from the component.

9. The one or more machine readable storage media of claim 1, wherein sending the telemetry information including sending the telemetry information in encrypted format.

10. The one or more machine readable storage media of claim 1, wherein the machine is to configure the TTG with a plurality of security policies based on telemetry consumer needs, and to adjust a security policy configured to the TTG and associated with a telemetry consumer based on a security policy adjustment request.

11. The one or more machine readable storage media of claim 1, wherein the machine is to process the telemetry data and generate the telemetry information by implementing an artificial intelligence model on the telemetry data.

12. The one or more machine readable storage media of claim 1, wherein the recommendation includes at least one of:
a recommendation to migrate a workload running on the component to a different component of the computing infrastructure;
a recommendation to take preventative action to cause migration of data stored in the component to the different component of the computing infrastructure;
a recommendation to prevent new workloads from being placed on the component;
a recommendation to prevent new data from being placed on the component;
a recommendation to split the workload running on the component between the component and the different component;
a recommendation to schedule maintenance or repair on the component; or
a recommendation to replace the component.

13. The one or more machine readable storage media of claim 1, wherein the telemetry data is first telemetry data, and the component is a first component, the machine to further:
determine a plurality of security policies to be applied to respective ones of a plurality of sets of telemetry data including the first telemetry data, the sets corresponding to respective ones of a plurality of components including the first component;
receive the sets of telemetry data in encrypted format;
based on each of the plurality of security policies:
process a corresponding set of the sets of telemetry data, processing including at least one of generating a transformed set of telemetry data or analyzing the corresponding set to generate a report therefrom; and
generate corresponding telemetry information from the corresponding set, the corresponding telemetry information from the corresponding set including at least one of processed telemetry data, a report or a recommendation based on an analysis of the telemetry data; and
send the corresponding telemetry information outside of the trusted execution environment.

14. The one or more machine readable storage media of claim 1, wherein the component is a component of a tenant, the machine to further:
determine a trust score for the tenant, the trust score corresponding to the tenant and to a workload running on the tenant;
determine whether the trust score for the tenant is less than or equal to a first trust threshold, Trust_Threshold_I;
determine whether the trust score for the tenant is less than or equal to a second trust threshold, Trust_Threshold_M;
in response to a determination that the trust score for the tenant is less than or equal to the first trust threshold, run the workload on the tenant in a trusted zone partitioned from a network that includes the tenant; and
in response to a determination that the trust score for the tenant is more than the first trust threshold and less than or equal to the second trust threshold, run the workload on the tenant in a trusted zone with increased monitoring.

15. An apparatus of a computing node of a network, the apparatus including a memory storing logic to implement a trusted telemetry governor (TTG) inside a trusted execution environment, and one or more processors coupled to the memory and to execute the logic to:
determine security policy to be applied to telemetry data corresponding to a component of a computing infrastructure, the security policy to indicate a correlation between, on one hand, a type of telemetry data consumer, and on another hand, at least one of a type or a form of telemetry data to be made accessible to the telemetry data consumer;
receive the telemetry data in encrypted format;
based on the security policy:
process the telemetry data including at least one of generating transformed telemetry data or analyzing the telemetry data to generate a report therefrom; and
generate telemetry information from the telemetry data, the telemetry information including at least one of processed telemetry data, a report or a recommendation based on an analysis of the telemetry data; and
send the telemetry information outside of the trusted execution environment.

16. The apparatus of claim 15, wherein sending the telemetry information outside of the trusted execution environment includes sending the telemetry information to the telemetry data consumer, the one or more processors to further verify an authorization certificate presented by the telemetry data consumer prior to sending the telemetry data to the telemetry data consumer, the authorization certificate based on the security policy.

17. The apparatus of claim 16, the one or more processors to further send attestation data to the telemetry data consumer based on the security policy.

18. The apparatus of claim 17, the one or more processors to further establish a secret key between the TTG and the telemetry data consumer and to verify the authorization certificate based on the secret key.

19. The apparatus of claim 15, wherein receiving the telemetry data includes receiving the telemetry data from a telemetry data collector (TDC), the TDC corresponding to an entity to directly receive the telemetry data from the component, the one or more processors to further verify an authorization certificate presented by the TDC prior to receiving the telemetry data, the authorization certificate based on the security policy.

20. A method to be performed by an apparatus of a computing node of a network to implement a trusted telemetry governor (TTG) inside a trusted execution environment, the method including:
  determining security policy to be applied to telemetry data corresponding to a component of a computing infrastructure, the security policy to indicate a correlation between, on one hand, a type of telemetry data consumer, and on another hand, at least one of a type or a form of telemetry data to be made accessible to the telemetry data consumer;
  receiving the telemetry data in encrypted format;
  based on the security policy:
  processing the telemetry data including at least one of generating transformed telemetry data or analyzing the telemetry data to generate a report therefrom; and
  generating telemetry information from the telemetry data, the telemetry information including at least one of processed telemetry data, a report or a recommendation based on an analysis of the telemetry data; and
  sending the telemetry information outside of the trusted execution environment.

21. The method of claim 20, wherein sending the telemetry information outside of the trusted execution environment includes sending the telemetry information to the telemetry data consumer, the method further including verifying an authorization certificate presented by the telemetry data consumer prior to sending the telemetry data to the telemetry data consumer, the authorization certificate based on the security policy.

22. The method of claim 21, the method further including sending attestation data to the telemetry data consumer based on the security policy.

* * * * *